US012664027B2

(12) United States Patent
Kurian et al.

(10) Patent No.: US 12,664,027 B2
(45) Date of Patent: Jun. 23, 2026

(54) DYNAMIC COMPUTING PLATFORM FOR REAL-TIME DATA CONTAINER GENERATION, AUTHORIZATION, AND THROTTLING MANAGEMENT

(71) Applicant: Bank of America Corporation, Charlotte, NC (US)

(72) Inventors: Manu Kurian, Dallas, TX (US); Paul Roscoe, Treuddyn Flintshire (GB); Padmanabhan Iyer, Cos Cob, CT (US); Mahesh Bhashetty, Plainsboro, NJ (US)

(73) Assignee: Bank of America Corporation, Charlotte, NC (US)

( * ) Notice: Subject to any disclaimer, the term of this patent is extended or adjusted under 35 U.S.C. 154(b) by 589 days.

(21) Appl. No.: 18/125,240

(22) Filed: Mar. 23, 2023

(65) Prior Publication Data

US 2024/0320058 A1     Sep. 26, 2024

(51) Int. Cl.
*G06F 9/455*     (2018.01)
*G06F 9/50*     (2006.01)

(52) U.S. Cl.
CPC .................................. *G06F 9/5077* (2013.01)

(58) Field of Classification Search
CPC .................................................... G06F 9/5077
USPC .......................................................... 718/1
See application file for complete search history.

(56) References Cited

U.S. PATENT DOCUMENTS

| | | | | | |
|---|---|---|---|---|---|
| 7,774,095 | B2 * | 8/2010 | Gallo | ................... | G06F 3/0605 |
| | | | | | 700/214 |
| 7,831,766 | B2 * | 11/2010 | Gokhale | ................. | G06F 16/13 |
| | | | | | 711/112 |
| 9,886,482 | B2 * | 2/2018 | Bendel | ................ | G06F 21/6218 |
| 10,019,323 | B1 * | 7/2018 | Bai | ..................... | G06F 11/1004 |
| 10,242,115 | B2 * | 3/2019 | Hultgren | ............. | G06F 16/9537 |
| 10,896,070 | B2 * | 1/2021 | Rao | ........................... | G06F 8/71 |
| 2012/0054153 | A1 * | 3/2012 | Dickgiesser | ........... | G06F 16/27 |
| | | | | | 707/623 |
| 2012/0233522 | A1 * | 9/2012 | Barton | ................ | G06F 11/1004 |
| | | | | | 707/E17.014 |
| 2013/0080389 | A1 * | 3/2013 | Curley | .................. | G06F 16/128 |
| | | | | | 707/E17.007 |

(Continued)

*Primary Examiner* — Mehran Kamran

(74) *Attorney, Agent, or Firm* — Banner & Witcoff, Ltd.

(57)     ABSTRACT

Aspects of the disclosure relate to real-time management of data container generation, authorization, and throttling. In some embodiments, a computing platform may receive and store data container management files, each associated with a different data container. The computing platform may thereafter receive a first data container and retrieve a first data container management file associated with the first data container. The computing platform may perform a preliminary analysis of the first data container to determine whether the first data container is complete. If the first data container is incomplete, the computing platform may send one or more analysis messages to a data container generation module to queue the first data container and retrieve an identification element associated with a missing data set. The computing platform may then retrieve the missing data set and generate an updated first data container by supplementing the first data container with the missing data set.

18 Claims, 13 Drawing Sheets

(56)        References Cited

U.S. PATENT DOCUMENTS

| | | | |
|---|---|---|---|
| 2014/0380097 A1* | 12/2014 | Dudgeon | G06F 11/1451 |
| | | | 714/21 |
| 2015/0169225 A1* | 6/2015 | Curley | H04L 67/1095 |
| | | | 711/162 |
| 2015/0324272 A1* | 11/2015 | Seibert, Jr. | G06F 11/0784 |
| | | | 717/131 |
| 2016/0212237 A1* | 7/2016 | Nishijima | G06F 9/45558 |
| 2017/0061006 A1* | 3/2017 | Hildebrand | H04L 67/1097 |
| 2017/0139978 A1* | 5/2017 | Hayworth | H04L 69/04 |
| 2019/0179687 A1* | 6/2019 | Wilkinson | G06F 11/2221 |
| 2020/0133720 A1* | 4/2020 | Chinthekindi | G06F 9/4875 |
| 2020/0293213 A1* | 9/2020 | Haridas | G06F 3/067 |
| 2021/0011946 A1* | 1/2021 | Haitsuka | G06F 21/10 |
| 2022/0103555 A1* | 3/2022 | Liu | H04L 63/10 |
| 2022/0217049 A1* | 7/2022 | Vohra | H04L 41/22 |
| 2022/0283911 A1* | 9/2022 | Thakkar | G06F 11/1469 |
| 2022/0374416 A1* | 11/2022 | Haitsuka | G06F 16/61 |
| 2022/0407741 A1* | 12/2022 | Kwon | G06F 9/45558 |
| 2022/0417053 A1* | 12/2022 | Wright | H04L 12/2818 |
| 2024/0320056 A1* | 9/2024 | Kurian | H04L 47/12 |
| 2024/0320058 A1* | 9/2024 | Kurian | G06F 11/3006 |
| 2024/0323122 A1* | 9/2024 | Kurian | H04L 63/102 |
| 2025/0272365 A1* | 8/2025 | Goldston | G06F 21/16 |

* cited by examiner

110

Dynamic Data Container Control Computing Platform

111

Processor(s)

112

Memory(s)

Data Container Input And Analysis Module
112a

Data Container Throttling Module
112b

Data Container Generation Module
112c

Data Container Rerouting Module
112d

113

Communication Interface(s)

301 — Receive Data Container Management File(s)

302 — Store Data Container Management Files

303 — Receive First Data Container

304 — Analyze First Data Container

305 — Send Analysis Message(s)

306 — Receive Analysis Messages

307 — Perform Throttling Analysis

308 — Queue First Data Container

309 — Send First Data Container

310 — Update Blockchain

322 — Receive Third Data Container

323 — Analyze Third Data Container

324 — Send Analysis Message(s)

325 — Receive Analysis Results

326 — Perform Rerouting Analysis

327 — Queue Third Data Container

328 — Generate Updated File/Container

329 — Send Third Data Container

330 — Send Updated Container Management File

331 — Update Blockchain

DYNAMIC COMPUTING PLATFORM FOR REAL-TIME DATA CONTAINER GENERATION, AUTHORIZATION, AND THROTTLING MANAGEMENT

BACKGROUND

Aspects of the disclosure relate to real-time management of data container generation, authorization, and throttling. In particular, one or more aspects of the disclosure relate to computing platforms that dynamically generate data containers based on data container configuration files, throttle the communication of data containers based on real-time internal and external network conditions, and dynamically re-route data containers based on real-time authorization data.

Computing systems commonly use data containers to transport large sets of data via predetermined communication paths. Such predetermined communication paths traverse multiple computing devices located within multiple networks (e.g., communication entities). However, once a data container is dispatched onto its predetermined communication path, the originating computing system no longer maintains any control over the transportation of the data container. Adherence to the predetermined communication path, which is often necessary for efficiency and planning purposes, precludes the use of real-time authorization data and/or real-time computer entity operating conditions data to optimize the transportation of the data container. Moreover, for purposes of security and auditing, the data containers are generally dispatched in immutable form. This precludes the use of real-time analysis of the data container content to advantageously supplement the data container contents in order to optimize the transportation of the data container.

SUMMARY

Aspects of the disclosure provide effective, efficient, scalable, and convenient technical solutions that address and overcome the technical problems associated with optimizing multi-network communication of data containers by utilizing real-time authorization data and real-time computer entity operating conditions to dynamically modify the content of data containers and/or the communication of data containers. In accordance with one or more embodiments of the disclosure, a computing platform comprising at least one processor, a communication interface, and memory storing computer-readable instructions may. The computing platform may receive, by a data container input and analysis module, one or more data container management files, each management file of the one or more data container management files being associated with a different data container and store, by the data container input and analysis module, the one or more data container management files. The computing platform may then receive, by the data container input and analysis module, a first data container and retrieve, by the data container input and analysis module, a first data container management file of the one or more data container management files, wherein the first data container management file is associated with the first data container. The computing platform may thereafter perform, by the data container input and analysis module, a first preliminary analysis of the first data container, where the first preliminary analysis comprises analyzing the first data container and the first data container management file to determine whether a first predetermined communication path of the first data container management file requires additional throttling analysis of the first data container. In response to determining that the first predetermined communication path requires additional throttling analysis of the first data container, the computing platform may send one or more analysis messages to a data container throttling module. Then, the computing platform may receive, by the data container throttling module, the one or more analysis messages, extract, by the data container throttling module and from the one or more analysis messages, a first communication entity listed in the first predetermined communication path, and retrieve, by the data container throttling module, one or more real-time operating conditions for the first communication entity. The computing platform may subsequently determine, by the data container throttling module and based on the one or more real-time operating conditions for the first communication entity, that the first data container requires additional throttling processing, and queue, by the data container throttling module, the first data container.

In one or more instances, determining that the first data container requires additional throttling processing may include determining that a first real-time operating condition of the one or more real-time operating conditions is below a threshold. In some instances, the computing platform may retrieve, by the data container throttling module, second one or more real-time operating conditions for the first communication entity, determine, by the data container throttling module and based on the second one or more real-time operating conditions for the first communication entity, that the first data container may be sent to the communication entity, and send, from the queue and by the data container throttling module, the first data container. In some instances, determining that the first data container requires additional throttling processing may include determining that a first real-time operating condition of the second one or more real-time operating conditions is above a threshold. In some instances, sending the first data container from the queue may include determining, by the data container throttling module and based on the one or more analysis messages, that the first data container needs additional preliminary analysis, and sending, by the data container throttling module and to the data container input and analysis module, the first data container.

In some instances, the computing platform may receive, by the data container input and analysis module, the first data container from the data container throttling module, determine, by the data container input and analysis module, that a second preliminary analysis is to be performed on the first data container, and perform the second preliminary analysis. In some instances, the second preliminary analysis may include the data container input and analysis module analyzing the first data container management file to determine whether rerouting analysis is required for the first data container. In some instances, the second preliminary analysis may include the data container input and analysis module analyzing the first data container and the first data container management file to determine whether the first data container is complete or incomplete.

In one or more instances, sending the first data container from the queue may include determining, by the data container throttling module and based on the one or more analysis messages, that the first data container does not need additional preliminary analysis, and sending, by the data container throttling module and to the first communication entity, the first data container.

In one or more instances, the first communication entity may include a communication network. In some instance, the one or more real-time operating conditions may include a real-time bandwidth of the communication network, a real-time latency of the communication network, or a real-time throughput of the communication network.

In accordance with one or more embodiments, a method is provided at a computing platform comprising at least one processor, a communication interface, and memory. The method may include receiving, by a data container input and analysis module, a first data container, retrieving, by the data container input and analysis module, a first data container management file associated with the first data container, and performing, by the data container input and analysis module, a first preliminary analysis of the first data container, wherein the first preliminary analysis comprises analyzing the first data container and the first data container management file to determine whether a first predetermined communication path of the first data container management file requires additional throttling analysis of the first data container. In response to determining that the first predetermined communication path requires additional throttling analysis of the first data container, the method may include sending one or more analysis messages to a data container throttling module. Thereafter, the method may include receiving, by the data container throttling module, the one or more analysis messages, extracting, by the data container throttling module and from the one or more analysis messages, a first communication entity listed in the first predetermined communication path, retrieving, by the data container throttling module, one or more real-time operating conditions for the first communication entity. The method may then include determining, by the data container throttling module and based on the one or more real-time operating conditions for the first communication entity, that the first data container requires additional throttling processing and queuing, by the data container throttling module, the first data container.

In one or more instances, determining that the first data container requires additional throttling processing may include determining that a first real-time operating condition of the one or more real-time operating conditions is below a threshold. In some instances, the method may further include retrieving, by the data container throttling module, second one or more real-time operating conditions for the first communication entity, determining, by the data container throttling module and based on the second one or more real-time operating conditions for the first communication entity, that the first data container may be sent to the communication entity, and sending, from the queue and by the data container throttling module, the first data container. Determining that the first data container requires additional throttling processing may include determining that a first real-time operating condition of the second one or more real-time operating conditions is above a threshold.

In one or more instances, sending the first data container from the queue may include determining, by the data container throttling module and based on the one or more analysis messages, that the first data container needs additional preliminary analysis, and sending, by the data container throttling module and to the data container input and analysis module, the first data container. In some instances, the method may further include receiving, by the data container input and analysis module, the first data container from the data container throttling module, determining, by the data container input and analysis module, that a second preliminary analysis is to be performed on the first data container, and performing the second preliminary analysis. In some instances, the second preliminary analysis may include the data container input and analysis module analyzing the first data container management file to determine whether rerouting analysis is required for the first data container. In some instances, the second preliminary analysis may include the data container input and analysis module analyzing the first data container and the first data container management file to determine whether the first data container is complete or incomplete.

In accordance with one or more embodiments, one or more non-transitory computer-readable media may be provided storing instructions that, when executed by a computing platform comprising at least one processor, a communication interface, and memory cause the computing platform to receive, by a data container input and analysis module, one or more data container management files, each management file of the one or more data container management files being associated with a different data container, store, by the data container input and analysis module, the one or more data container management files, receive, by the data container input and analysis module, a first data container, retrieve, by the data container input and analysis module, a first data container management file of the one or more data container management files, wherein the first data container management file is associated with the first data container, perform, by the data container input and analysis module, a first preliminary analysis of the first data container, wherein the first preliminary analysis comprises analyzing the first data container and the first data container management file to determine whether a first predetermined communication path of the first data container management file requires additional throttling analysis of the first data container, in response to determining that the first predetermined communication path requires additional throttling analysis of the first data container, send one or more analysis messages to a data container throttling module, receive, by the data container throttling module, the one or more analysis messages, extract, by the data container throttling module and from the one or more analysis messages, a first communication entity listed in the first predetermined communication path, retrieve, by the data container throttling module, one or more real-time operating conditions for the first communication entity, determine, by the data container throttling module and based on the one or more real-time operating conditions for the first communication entity, that the first data container requires additional throttling processing, and queue, by the data container throttling module, the first data container.

In accordance with one or more embodiments of the disclosure, a computing platform comprising at least one processor, a communication interface, and memory storing computer-readable instructions may receive, by a data container input and analysis module, one or more data container management files, each management file of the one or more data container management files being associated with a different data container and store, by the data container input and analysis module, the one or more data container management files. The computing platform may then receive, by the data container input and analysis module, a first data container, retrieve, by the data container input and analysis module, a first data container management file of the one or more data container management files, wherein the first data container management file is associated with the first data container, and perform, by the data container input and analysis module, a first preliminary analysis of the first data container, wherein the first preliminary analysis comprises analyzing the first data container and the first data container management file to determine whether the first data container is complete or incomplete. In response to determining that the first data container is incomplete, the computing platform may send one or more analysis messages to a data container generation module, receive, by the data container generation module, the one or more analysis messages, queue, by the data container generation module, the first data container, and retrieve, by the data container generation module and from the one or more analysis messages, an identification element associated with a missing data set. Thereafter, computing platform may retrieve, by the data container generation module and from a source computing device, the missing data set. The computing platform may then generate, by the data container generation module, an updated first data container by supplementing the first data container with the missing data set.

In one or more instances, determining whether the first data container is complete or incomplete may include comparing one or more identification elements in the first data container management file with one or more identification elements in the first data container. Determining that the first data container is incomplete may include determining that a first identification element from the first data container management file is missing from the first data container. In some instances, the one or more analysis messages may include the first identification element. In some instances, the first identification element may be sent to the source computing device.

In one or more instances, the computing platform may send, by the data container generation module and to the source computing device, an amount of time allotted to the source computing device for providing the missing data set. In some instances, the computing platform may send the first data container from the queue. In some instances, sending the first data container from the queue may include determining, by the data container generation module and based on the one or more analysis messages, that the first data container needs additional preliminary analysis, and sending, by the data container generation module and to the data container input and analysis module, the first data container.

In one or more instances, the computing platform may receive, by the data container input and analysis module and from the data container generation module, the first data container, determine, by the data container input and analysis module, that a second preliminary analysis is to be performed on the first data container, and perform, by the data container input and analysis module, the second preliminary analysis. The second preliminary analysis may include analyzing the first data container management file to determine whether rerouting analysis is required for the first data container. The second preliminary analysis may include analyzing the first data container and the first data container management file to determine whether a first predetermined communication path of the first data container management file requires additional throttling analysis of the first data container.

In accordance with one or more embodiments, a method is provided at a computing platform comprising at least one processor, a communication interface, and memory. The method may include receiving, by a data container input and analysis module, a first data container, retrieving, by the data container input and analysis module, a first data container management file associated with the first data container, and performing, by the data container input and analysis module, a first preliminary analysis of the first data container, wherein the first preliminary analysis comprises analyzing the first data container and the first data container management file to determine whether the first data container is complete or incomplete. In response to determining that the first data container is incomplete, the method may then include sending one or more analysis messages to a data container generation module. The method may thereafter include receiving, by the data container generation module, the one or more analysis messages, queuing, by the data container generation module, the first data container, and retrieving, by the data container generation module and from the one or more analysis messages, an identification element associated with a missing data set. Subsequently, the method may include retrieving, by the data container generation module and from a source computing device, the missing data set, and generating, by the data container generation module, an updated first data container by supplementing the first data container with the missing data set.

In one or more instances, determining whether the first data container is complete or incomplete may include comparing one or more identification elements in the first data container management file with one or more identification elements in the first data container. In some instances, determining that the first data container is incomplete may include determining that a first identification element from the first data container management file is missing from the first data container.

In some instances, the one or more analysis messages may include the first identification element. In some instances, the first identification element may be sent to the source computing device. In one or more instances, the method may further include sending, by the data container generation module and to the source computing device, an amount of time allotted to the source computing system for providing the missing data set.

In one or more instances, the method may further include determining, by the data container generation module and based on the one or more analysis messages, that the first data container needs additional preliminary analysis, sending, by the data container generation module and to the data container input and analysis module, the first data container, receiving, by the data container input and analysis module and from the data container generation module, the first data container, and performing, by the data container input and analysis module, the additional preliminary analysis. In some instances, the method may include analyzing the first data container and the first data container management file to determine whether a first predetermined communication path of the first data container management file requires additional throttling analysis of the first data container, or analyzing the first data container management file to determine whether rerouting analysis is required for the first data container.

In accordance with one or more embodiments, one or more non-transitory computer-readable media may be provided storing instructions that, when executed by a computing platform comprising at least one processor, a communication interface, and memory cause the computing platform to receive, by a data container input and analysis module, one or more data container management files, each management file of the one or more data container management files being associated with a different data container, store, by the data container input and analysis module, the one or more data container management files, receive, by the data container input and analysis module, a first data container, retrieve, by the data container input and analysis module, a first data container management file of the one or more data container management files, wherein the first data container management file is associated with the first data container, perform, by the data container input and analysis module, a first preliminary analysis of the first data container, wherein the first preliminary analysis comprises analyzing the first data container and the first data container management file to determine whether the first data container is complete or incomplete, in response to determining that the first data container is incomplete, send one or more analysis messages to a data container generation module, receive, by the data container generation module, the one or more analysis messages, queue, by the data container generation module, the first data container, retrieve, by the data container generation module and from the one or more analysis messages, an identification element associated with a missing data set, retrieve, by the data container generation module and from a source computing device, the missing data set, and generate, by the data container generation module, an updated first data container by supplementing the first data container with the missing data set.

In accordance with one or more embodiments of the disclosure, a computing platform comprising at least one processor, a communication interface, and memory storing computer-readable instructions may receive, by a data container input and analysis module, one or more data container management files, each management file of the one or more data container management files being associated with a different data container, and store, by the data container input and analysis module, the one or more data container management files. The computing platform may then receive, by the data container input and analysis module, a first data container, retrieve, by the data container input and analysis module, a first data container management file of the one or more data container management files, wherein the first data container management file is associated with the first data container, and perform, by the data container input and analysis module, a first preliminary analysis of the first data container, wherein the first preliminary analysis comprises analyzing the first data container management file to determine whether rerouting analysis is required for the first data container. In response to determining that rerouting analysis is required for the first data container, the computing platform may send one or more analysis messages to a data container rerouting module. The computing platform may. The computing platform may then receive, by the data container rerouting module, the one or more analysis messages, retrieve, by the data container rerouting module, real-time authorization data for the first data container. The computing platform may thereafter determine, by the data container rerouting module and based on the real-time authorization data for the first data container, that the first data container requires additional rerouting processing, and queue, by the data container rerouting module, the first data container.

In one or more instances, determining that the first data container requires additional rerouting processing may include determining, by the data container rerouting module, that a first communication entity listed on a first predetermined communication path of the first data container management file matches a second communication entity listed in the real-time authorization data.

In one or more instances, the computing platform may further reroute, by the data container rerouting module, the first data container by generating an updated first predetermined communication path for the first data container management file of the first data container. In some instances, determining that the first data container requires additional rerouting processing further comprises determining, by the data container rerouting module and based on the real-time authorization data, that the first data container is missing one or more data sets. In some instances, the updated first predetermined communication path comprises one or more communication entities that are different than one or more communication entities in the real-time authorization data.

In one or more instances, the computing platform may retrieve the one or more missing data sets, and generate an updated first data container by supplementing the first data container with the one or more missing data sets. In some instances, the computing platform may further send, by the data container rerouting module and to a communication entity listed in the updated first predetermined communication path, the updated first data container, and send, by the data container rerouting module and to a second computing platform listed in the updated first predetermined communication path, the first data container management file, wherein the first data container management file comprises the updated first predetermined communication path. In some instances, the computing platform may send, by the data container rerouting module, to the data container input and analysis module and in response to determining that the updated first data container requires additional preliminary processing, the updated first data container.

In one or more instances, receive, by the data container input and analysis module, the updated first data container from the data container rerouting module, determine, by the data container input and analysis module, that a second preliminary analysis is to be performed on the updated first data container, and perform, by the data container input and analysis module, the second preliminary analysis. In some instances, performing the second preliminary analysis may include analyzing, by the data container input and analysis module, the updated first data container and the first data container management file to determine whether the updated first predetermined communication path requires additional throttling analysis of the first data container. In some instances, analyzing the updated first predetermined communication path may include comparing one or more communication entities from the updated first predetermined communication path with a stored list of one or more communication entities.

In accordance with one or more embodiments, a method is provided at a computing platform comprising at least one processor, a communication interface, and memory. The method may include receiving, by a data container input and analysis module, a first data container, and retrieving, by the data container input and analysis module, a first data container management file of the one or more data container management files, wherein the first data container management file is associated with the first data container. The method may then include performing, by the data container input and analysis module, a first preliminary analysis of the first data container, wherein the first preliminary analysis comprises analyzing the first data container management file to determine whether rerouting analysis is required for the first data container. in response to determining that rerouting analysis is required for the first data container, sending one or more analysis messages to a data container rerouting module, receiving, by the data container rerouting module, the one or more analysis messages, and retrieving, by the data container rerouting module, real-time authorization data for the first data container. Subsequently, the method may include determining, by the data container rerouting module and based on the real-time authorization data for the first data container, that the first data container requires additional rerouting processing, and queuing, by the data container rerouting module, the first data container.

In one or more instances, determining that the first data container requires additional rerouting processing may include determining, by the data container rerouting module, that a first communication entity listed on a first predetermined communication path of the first data container management file matches a second communication entity listed in the real-time authorization data. In some instances, the method may further include rerouting, by the data container rerouting module, the first data container by generating an updated first predetermined communication path for the first data container management file of the first data container. The updated first predetermined communication path may include one or more communication entities that are different than one or more communication entities in the real-time authorization data.

In one or more instances, determining that the first data container requires additional rerouting processing further may include determining, by the data container rerouting module and based on the real-time authorization data, that the first data container is missing one or more data sets. In some instances, the method may further include retrieving the one or more missing data sets, and generating an updated first data container by supplementing the first data container with the one or more missing data sets. In some instances, the method may further include sending, by the data container rerouting module and to a communication entity listed in the updated first predetermined communication path, the updated first data container, and sending, by the data container rerouting module and to a second computing platform listed in the updated first predetermined communication path, the first data container management file, wherein the first data container management file comprises the updated first predetermined communication path. In some instances, the method may further include sending, by the data container rerouting module, to the data container input and analysis module and in response to determining that the updated first data container requires additional preliminary processing, the updated first data container.

In accordance with one or more embodiments, one or more non-transitory computer-readable media may be provided storing instructions that, when executed by a computing platform comprising at least one processor, a communication interface, and memory cause the computing platform to receive, by a data container input and analysis module, one or more data container management files, each management file of the one or more data container management files being associated with a different data container, store, by the data container input and analysis module, the one or more data container management files, receive, by the data container input and analysis module, a first data container, retrieve, by the data container input and analysis module, a first data container management file of the one or more data container management files, wherein the first data container management file is associated with the first data container, perform, by the data container input and analysis module, a first preliminary analysis of the first data container, wherein the first preliminary analysis comprises analyzing the first data container management file to determine whether rerouting analysis is required for the first data container, in response to determining that rerouting analysis is required for the first data container, send one or more analysis messages to a data container rerouting module, receive, by the data container rerouting module, the one or more analysis messages, retrieve, by the data container rerouting module, real-time authorization data for the first data container, determine, by the data container rerouting module and based on the real-time authorization data for the first data container, that the first data container requires additional rerouting processing, and queue, by the data container rerouting module, the first data container.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1A:
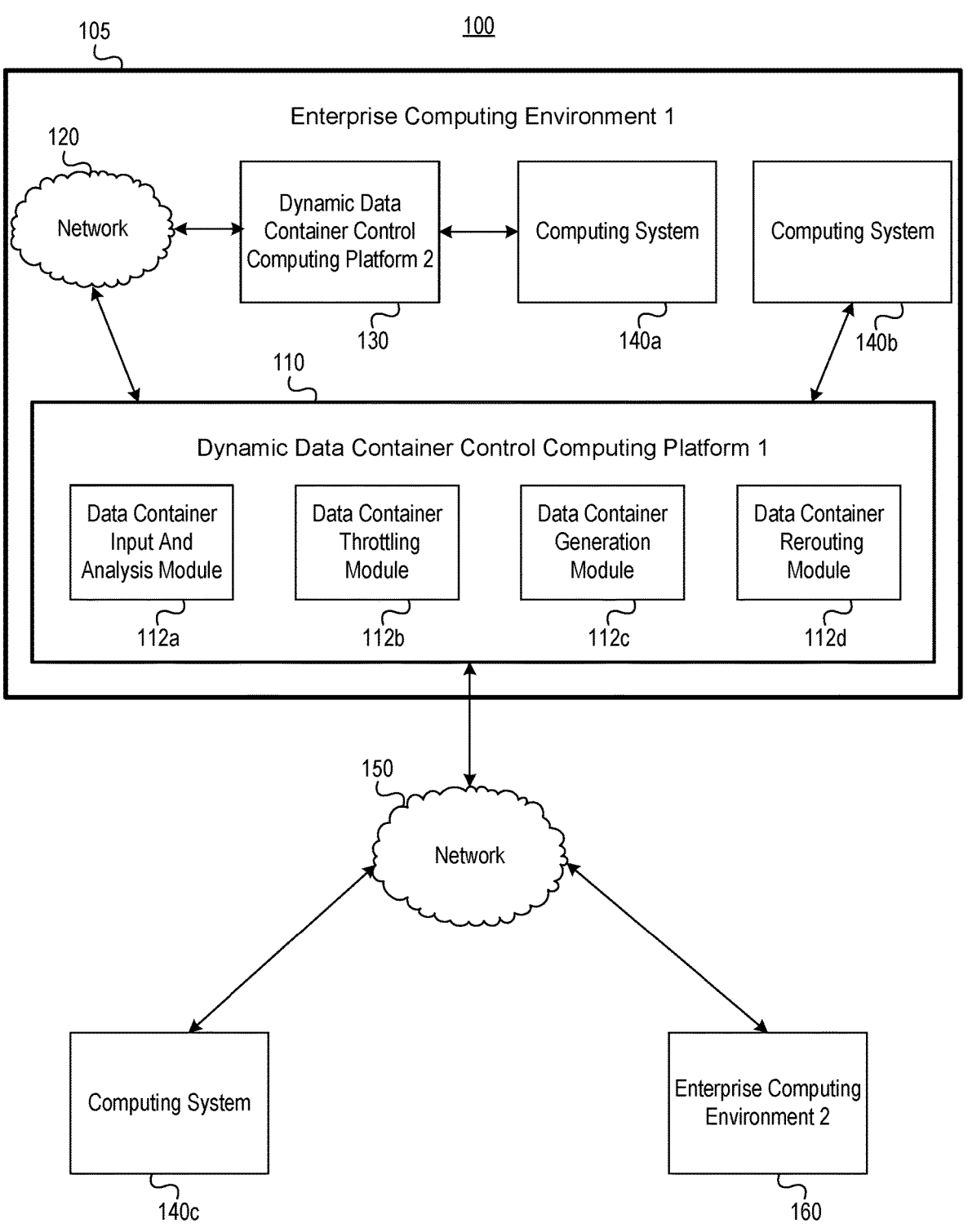
FIGS. 1A-1B depict an illustrative computing environment for a dynamic data container control computing platform dynamically optimizing the content and communication of data containers in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe systems and methods for dynamically optimizing multi-network and multi-device communication of data containers. While the use of predetermined communication paths for transporting data containers across multiple networks and computing devices offers numerous benefits, it may also preclude the utilization of real-time authorization data and real-time communication entity operating conditions data to dynamically modify the content of data containers and/or the communication of data containers, thereby resulting in inefficient use of data containers and overloading communication networks.

In order to solve for the above-noted shortcomings, a computing platform may be configured to dynamically analyze and modify the content and communication of data containers based on real-time authorization data and/or real-time communication entity operating conditions data. Specifically, systems, methods, and apparatuses described herein may provide a dynamic data container control computing platform.

The dynamic data container control computing platform may include a system architecture including one or more of the following: a data container input and analysis module, a data container throttling module, a data container generation module, and a data container rerouting module. The dynamic data container control computing platform may be employed in a computing environment comprising multiple communication entities, each with varying bandwidth and security requirements. The communication networks of the computing environment may include multiple dynamic data container control computing platforms, each associated with a different computing system, enterprise, geographical location, network security level, and/or the like. Various communication channels may be established within each communication network and/or between the different communication networks, and in one instance, a dynamic data container control computing platform may be placed on inputs and/or outputs of those communication channels. The communication channels (along with other communication entities, discussed below) may be utilized to transport data containers within the communication networks and/or between the communication networks. The dynamic data container control computing platforms may utilize real-time authorization data and/or real-time communication entity operating conditions data to dynamically optimize the contents of the data containers and/or the communication of the data containers through the communication entities, including networks and channels.

Figure 1B:
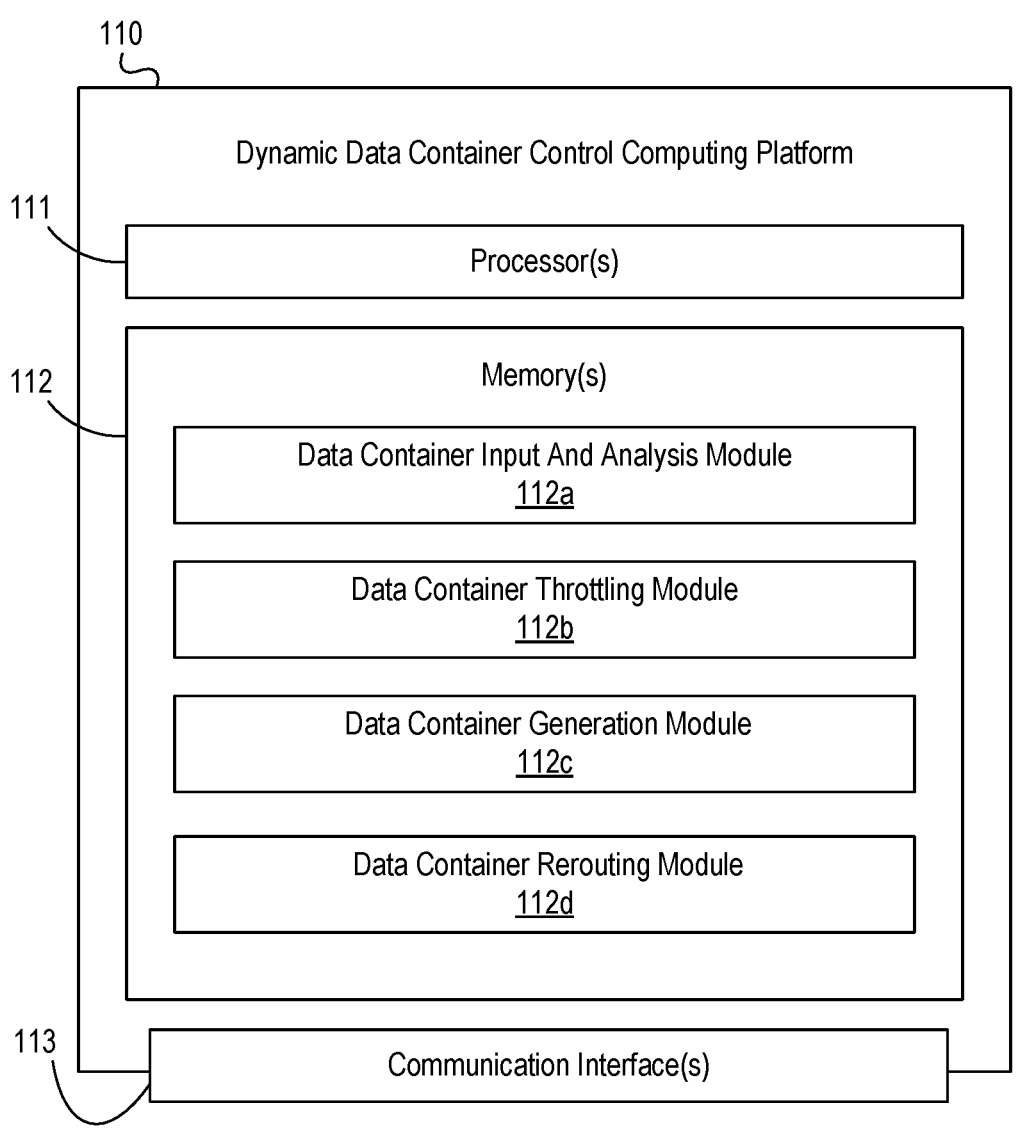

FIGS. 1A-1B depict an illustrative computing environment for a dynamic data container control computing platform for dynamically optimizing the content and communication of data containers in accordance with one or more example embodiments. FIG. 1A depicts an illustrative computing environment that implements a dynamic data container control computing platform with one or more example embodiments. Referring to FIG. 1A, computing environment 100 may include one or more enterprise computing environments, such as enterprise computing environment 105 and enterprise computing environment 160. Enterprise computing environment 160 may include the same or similar devices, networks, and functionality as illustrated with respect to enterprise computing environment 105. Although only two enterprise computing environments are shown in FIG. 1A, it is understood that computing environment 100 may include any number of enterprise computing environments. Enterprise computing environment 105 may be connected to network 150, and may further be connected to enterprise computing environment 160 and computing system 140c via network 150. Each enterprise computing environment (such as enterprise computing environment 105 and enterprise computing environment 160) may include one or more dynamic data container control computing platforms. For example, enterprise computing environment 105 may include dynamic data container control computing platform 110 and dynamic data container control computing platform 130. Dynamic data container control computing platform 110 and dynamic data container control computing platform 130 may be similar in structure and functionality. Dynamic data container control computing platform 110 and dynamic data container control computing platform 130 may each be connected to one or more networks that are external to enterprise computing environment 105 (such as network 150) or internal to enterprise computing environment 105 (such as network 120). In one instance, all incoming and outgoing traffic for each enterprise computing environment may pass through a dynamic data container control computing platform. Dynamic data container control computing platform 110 may further be connected to one or more computing systems directly (such as computing system 140b). Dynamic data container control computing platform 110 may further be connected to one or more computing systems indirectly (such as computing system 140a), via dynamic data container control computing platform 130 and network 120.

As described further below, dynamic data container control computing platform 110 may be a computer system that includes one or more computing devices (e.g., servers, server blades, or the like) and/or other computer components (e.g., processors, memories, communication interfaces) that may be used to dynamically manage the generation, routing, and throttling of data containers in real-time. In some instances, dynamic data container control computing platform 110 may be controlled or otherwise maintained by an enterprise organization such as a financial institution.

Each of computing systems 140a, 140b and 140c may be a computer system that includes one or more computing devices (e.g., servers, server blades, laptop computers, desktop computers, mobile devices, tablets, smartphones, credit card readers, or the like) and/or other computer components (e.g., processors, memories, communication interfaces) that may be used to perform enterprise operations and/or data container processing. In one or more instances, these computing systems may be configured to communicate with one or more modules of dynamic data container control computing platform 110 for sending data containers, data container management files, and/or data sets.

The one or more networks in computing environment 100 may interconnect one or more of dynamic data container control computing platform 130, dynamic data container control computing platform 110, enterprise computing environment 160, and computing system 140a, computing system 140b, and/or computing system 140c. For example, computing environment 100 may include a network 120 internal to enterprise computing environment 105 which interconnects one or more devices therein (such as dynamic data container control computing platform 110 and dynamic data container control computing platform 130). Computing environment 100 may also include a network 150 that is external to enterprise computing environment 105 and interconnects one or more internal components of enterprise computing environment 105 (such as dynamic data container control computing platform 110) and one or more external components, such as computing system 140c and enterprise computing environment 160.

Dynamic data container control computing platform 110 (and similarly, dynamic data container control computing platform 130) may include one or more modules therein, such as data container input and analysis module 112a, data container throttling module 112b, data container generation module 112c, and data container rerouting module 112d. Each of these modules may include memory and one or more processors for executing the functionality of these modules, which are discussed below with reference to FIGS. 2A-3C.

In one or more arrangements, dynamic data container control computing platform 110, the modules of dynamic data container control computing platform 110, dynamic data container control computing platform 130, computing system 140a, computing system 140b, and computing system 140c may be any type of computing device capable of sending and/or receiving data containers, data container management files, and/or data sets, and processing the data containers, data container management files, and/or data sets, accordingly. For example, dynamic data container control computing platform 110, the modules of dynamic data container control computing platform 110, dynamic data container control computing platform 130, computing system 140a, computing system 140b, and computing system 140c, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of dynamic data container control computing platform 110, the modules of dynamic data container control computing platform 110, dynamic data container control computing platform 130, computing system 140a, computing system 140b, and computing system 140c may, in some instances, be special-purpose computing devices configured to perform specific functions.

Referring to FIG. 1B, dynamic data container control computing platform 110 may include one or more processors 111, memory 112, and communication interface 113. A data bus may interconnect processor 111, memory 112, and communication interface 113. Communication interface 113 may be a network interface configured to support communication between dynamic data container control computing platform 110 and one or more networks (e.g., network 120, network 150, or the like). Memory 112 may include one or more program modules having instructions that when executed by processor 111 cause dynamic data container control computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of dynamic data container control computing platform 110 and/or by different computing devices that may form and/or otherwise make up container security computing platform 110. For example, memory 112 may have, host, store, and/or include a data container input and analysis module 112a, a data container throttling module 112b, a data container generation module 112c, and a data container rerouting module 112d. Each of data container input and analysis module 112a, data container throttling module 112b, data container generation module 112c, and data container rerouting module 112d may include its own memory (similar to memory 112) and/or processor(s) (similar to processor 111) to perform the functionality of these modules are described herein.

Data container input and analysis module 112a may have instructions that direct and/or cause dynamic data container control computing platform 110 to, for instance, receive one or more data container management files, receive one or more data containers for transportation, and/or to analyze a data container management file and/or a data container, as discussed in greater detail below. Data container input and analysis module 112a may analyze a data container and/or a management file corresponding to the data container to perform any combination of one or more of a first preliminary analysis, a second preliminary analysis, or a third preliminary analysis. The first preliminary analysis may comprise analyzing the data container and its corresponding management file to determine whether a predetermined communication path specified by the corresponding management file for transportation of the data container necessitates additional throttling analysis of the data container. A second preliminary analysis additionally or alternatively performed may comprise analyzing a data container to determine whether the data container is complete or whether the data container is missing one or data sets (and thus requires additional generation processing). A third preliminary analysis additionally or alternatively performed may comprise analyzing the management file corresponding to the data container to determine whether the data container is part of a regulatory reporting requirement that requires additional rerouting analysis of the data container. In response to the results of performing any of those analysis, data container input and analysis module 112a may send one or more analysis messages indicating that the data container needs additional analysis to one or more of data container throttling module 112b, data container generation module 112c, or data container rerouting module 112d.

Data container throttling module 112b may receive one or more analysis messages from the data container input and analysis module 112a. Data container throttling module 112b may queue the data container for subsequent transportation and perform throttling analysis using the data container configuration file and real-time communication entity operating conditions data. Data container throttling module 112b may repeatedly analyze real-time communication entity operating conditions until data container throttling module 112b determines that the real-time communication entity operating conditions indicate that a communication entity listed in a predetermined communication path of the management file of the data container can handle additional data containers. Subsequent to such a determination, data container throttling module 112b may send the data container from the queue to the communication entity.

Data container generation module 112c may receive one or more analysis messages from the data container input and analysis module 112a. Data container generation module 112c may queue the data container for subsequent transportation and perform real-time generation processing on the data container. Specifically, data container generation module 112c may retrieve one or more identification elements associated with one or more data sets that are missing from the data container. Data container generation module 112c may send the one or more identification elements to one or more source computing devices in order to retrieve the one or more missing data sets. Data container generation module 112c may generate an updated data container by supplementing the data container with the one or more missing data sets. Data container generation module 112c may then release the updated data container from the queue.

Data container rerouting module 112d may receive one or more analysis messages from the data container input and analysis module 112a. Data container rerouting module 112d may queue the data container for subsequent transportation and perform additional rerouting analysis using the data container configuration file and real-time authorization data. Specifically, data container rerouting module 112d may retrieve real-time authorization data associated with the data container. Based on the real-time authorization data, data container rerouting module 112d may determine if the data container needs to be rerouted. If so, data container rerouting module 112d may generate an updated predetermined communication path for the management file of the data container. Based on the real-time authorization data, data container rerouting module 112d may further determine whether the data container needs to be supplemented with additional data sets. If so, data container rerouting module 112d may retrieve the additional data sets from one or more source computing devices. Data container rerouting module 112d may generate an updated data container by supplementing the data container with the additional data sets. Data container rerouting module 112d may then send the updated data container from the queue. Data container rerouting module 112d may also send the updated management file (e.g., the management file with the updated predetermined communication path) to one or more communication entities listed on the updated predetermined communication path.

FIGS. 2A-2H depict an illustrative event sequence for a dynamic data container control computing platform 110 dynamically optimizing the content and communication of data containers in accordance with one or more example embodiments. Aspects of the illustrative event sequence described herein provide effective, efficient, scalable, and convenient technical solutions that address and overcome the technical problems associated with transporting data containers using predetermined communication paths.

Figure 2A:
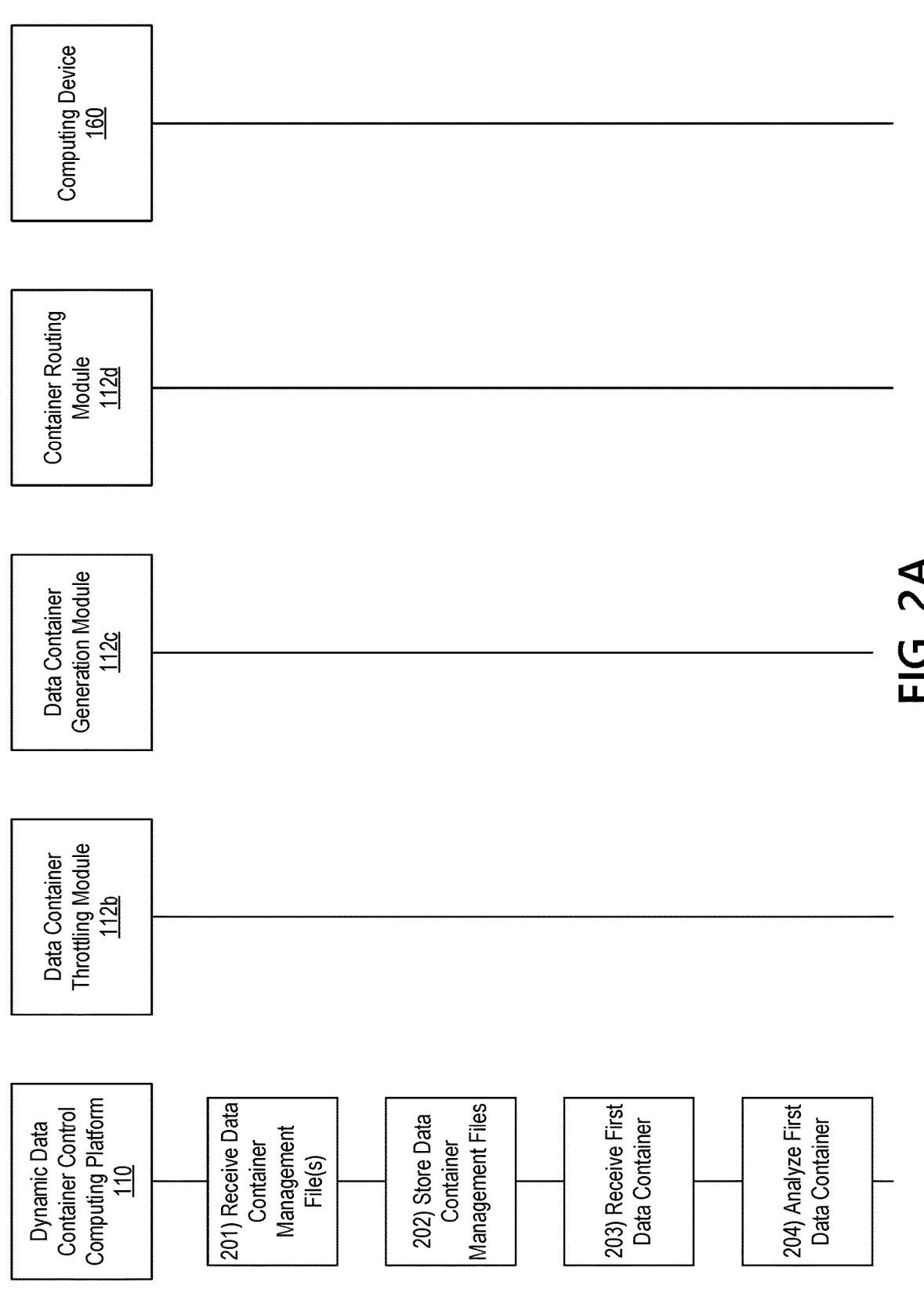
FIGS. 2A-2H depict an illustrative event sequence for a dynamic data container control computing platform dynamically optimizing the content and communication of data containers in accordance with one or more example embodiments.

Referring to FIG. 2A, at step 201, dynamic data container control computing platform 110 may receive one or more data container management files. Steps 201-205, discussed below, may be performed by data container input and analysis module 112*a* of dynamic data container control computing platform 110. Each of the data container management files may be associated with a different data container (which as discussed below, may be subsequently received by dynamic data container control computing platform 110). Dynamic data container control computing platform 110 may receive the one or more data container management files via its data container input and analysis module 112*a*. Although the step of dynamic data container control computing platform 110 receiving the one or more data container management files is depicted as occurring only once within the illustrative event sequence depicted in FIGS. 2A-2H, it is understood that this is for illustrative purposes only, and that dynamic data container control computing platform 110 can continue to receive these data container management files intermittently or at regular intervals during the illustrative event sequence.

As noted above, each management file may be associated with a different data container. The management file may include a data container identification element that identifies a particular data container. The data container associated with the management file may include the same data container identification element. Dynamic data container control computing platform 110 may subsequently utilize these data container identification elements to determine which management file is associated with a received data container. The management file may further include a predetermined communication path for its corresponding data container. The predetermined communication path in the corresponding management file for a data container may identify various communication entities, such as computing systems, communication networks, communication channels, network nodes, dynamic data container control computing platforms, etc., through which the associated data container is to be transported. The management file may further indicate specific dates and/or times at which the data container is to be sent through the various elements of the predetermined communication path. The management file may further indicate requirements regarding the contents of the corresponding data container.

However, unlike conventional data containers and their associated predetermined communication paths, the data containers and their associated predetermined communication paths as presented herein are not immutable. For example, as discussed below with reference to the throttling analysis performed by data container throttling module 112*b*, dynamic data container control computing platform 110 may deviate from the dates and/or times stipulated in the management file based on an analysis of real-time communication network data for one or more of the communication networks indicated by predetermined communication path in the management file. In another example, as discussed below with reference to the generation analysis performed by data container generation module 112*c* and/or the rerouting analysis performed by data container rerouting module 112*d*, dynamic data container control computing platform 110 may modify the data container itself by supplementing its data content based on the data content requirements stipulated in the management file. And in yet another example, as discussed below with reference to the rerouting analysis performed by data container rerouting module 112*d*, dynamic data container control computing platform 110 may modify the predetermined communication path for the data container based on real-time authorization data received by dynamic data container control computing platform 110 from one or more computing devices (and in turn, dynamic data container control computing platform 110 may also update the management file to reflect the updated predetermined communication path for the associated data container). At step 202, dynamic data container control computing platform 110 may store the data container management files received by dynamic data container control computing platform 110 at step 201 in internal memory (for example, memory 112) or external memory.

At step 203, dynamic data container control computing platform 110 may receive a first data container. Dynamic data container control computing platform 110 may receive the first data container from a communication entity located internal to enterprise computing environment 105 or external to enterprise computing environment 105. In one instance, the communication entity may be another dynamic data container control computing platform. The first data container may be received by data container input and analysis module 112*a* of dynamic data container control computing platform 110. In response to receiving the first data container, dynamic data container control computing platform 110 may store the first data container in internal memory (for example, memory 112) or external memory.

At step 204, dynamic data container control computing platform 110 may perform a preliminary analysis of first data container. The preliminary analysis may be performed by data container input and analysis module 112*a* of dynamic data container control computing platform 110. Dynamic data container control computing platform 110 may perform the preliminary analysis of first data container using a management file previously received by dynamic data container control computing platform 110 (for example, at step 201). To locate the management file associated with the first data container, dynamic data container control computing platform 110 may first extract a first data container identification element from the first data container. After extracting the first data container identification element from the first data container, dynamic data container control computing platform 110 may compare the first data container identification element to each of the data container identification elements of the data container management files previously stored by dynamic data container control computing platform 110. As a result of the comparing, dynamic data container control computing platform 110 may identify a first management file that is associated with the first data container based on the first management file including a data container identification element that matches the first data container identification element.

Dynamic data container control computing platform 110 may then analyze the first data container based in part on the first management file. The first management file may include a first predetermined communication path for the first data container. The first predetermined communication path may identify various communication entities, such as computing systems, communication networks, communication channels, network nodes, dynamic data container control computing platforms, etc. through which the first data container is to be transported. The first management file may further indicate specific dates and/or times at which the first data container is to be sent through the communication entities of the first predetermined communication path. The first management file may further indicate requirements regarding the contents of the first data container. For example, the first management file may identify certain datasets that are to be included within the first data container, along with information identifying the source for each of those datasets.

A first preliminary analysis performed by dynamic data container control computing platform 110 may comprise dynamic data container control computing platform 110 analyzing a data container and an associated management file to determine whether a predetermined communication path specified by the corresponding management file for transportation of the data container necessitates additional throttling analysis of the data container. In a first example, dynamic data container control computing platform 110 may store a list of communication entities, such as computing systems, communication networks, communication channels, network nodes, dynamic data container control computing platforms, etc. Dynamic data container control computing platform 110 may compare the contents of this list against the contents of the predetermined communication path of the corresponding management file to determine whether any communication entities through which the data container is designated to pass through are also included in the list of communication entities stored by dynamic data container control computing platform 110. If so, dynamic data container control computing platform 110 may determine that additional throttling analysis and/or processing is required by dynamic data container control computing platform 110.

In a second example, dynamic data container control computing platform 110 may be part of a network transmission mesh that is used by an enterprise organization to send and process batches of data. Dynamic data container control computing platform 110 may determine, based on the management file associated with the data container, that the data container is part of a batch of data that is being sent by the enterprise organization. For example, the corresponding management file may include a batch identification element indicating the specific batch of data to which the data container belongs. In this instance, dynamic data container control computing platform 110 may determine that the data container requires additional analysis and/or processing to determine whether the data container may be forwarded as indicated by the predetermined communication path of the corresponding management file or whether the data container needs to be throttled to accommodate the other data containers that are part of the same batch of data.

A second preliminary analysis additionally or alternatively performed by dynamic data container control computing platform 110 may comprise dynamic data container control computing platform 110 analyzing a data container to determine whether the data container is complete or whether the data container is missing one or data sets. To perform this analysis, dynamic data container control computing platform 110 may compare, in real-time, the contents of the data container with the one or more data sets identified by the corresponding management file. The one or more data sets in the corresponding management file may each be tagged with identifying data, such as an identification number. Similarly, the data sets in the data container may also be tagged with identifying data, such as an identification number. Dynamic data container control computing platform 110 may compare the identification numbers of the data sets in the corresponding management file with the identification numbers in the data container. Based on this comparing, dynamic data container control computing platform 110 may determine, in real-time, which data sets (if any), are missing from the data container. In response to determining that the data container is missing one or more data sets, dynamic data container control computing platform 110 may determine that the fc requires additional generation analysis and/or processing.

A third preliminary analysis additionally or alternatively performed by dynamic data container control computing platform 110 may comprise dynamic data container control computing platform 110 analyzing a management file corresponding to a data container to determine whether additional rerouting analysis (e.g., analyzing real-time authorization conditions associated with the data container necessitates rerouting or modification of the data container) is needed for the data container. The data container may originate from an enterprise organization. The enterprise organization may be sending the data container to maintain compliance with the regulations of a third-party organization, such as a regulatory body. The regulatory body may regularly or intermittently send updated requirements for the contents of the data container or the transportation of the data container. In this instance, dynamic data container control computing platform 110 may determine, based on the corresponding management file, whether rerouting analysis and/or processing is required for the data container before it may be forwarded to the next communication entity (such as computing systems, communication networks, communication channels, network nodes, dynamic data container control computing platforms, etc., as stipulated by a predetermined communication path of the corresponding management file).

Dynamic data container control computing platform 110 may perform any combination of one or more of the first preliminary analysis, the second preliminary analysis, or the third preliminary analysis in any order. For example, dynamic data container control computing platform 110 may perform the second preliminary analysis and determine that a data container is missing data. As discussed below with reference to steps 214-221, data container generation module 112c may supplement the data container with the missing data and return the data container to data container input and analysis module 112a. Dynamic data container control computing platform 110 may then perform the first preliminary analysis on the data container and determine that additional throttling analysis and/or processing is needed for the data container. As discussed below with steps 206-208, dynamic data container control computing platform 110 may then perform the additional throttling analysis and/or processing on the data container. In a second example, dynamic data container control computing platform 110 may perform the third preliminary analysis and determine that a data container requires additional rerouting processing. As discussed below with reference to steps 226-231, dynamic data container control computing platform 110 may perform the rerouting processing on the data container and then return the data container to data container input and analysis module 112a. Dynamic data container control computing platform 110 may then perform the first preliminary analysis on the data container and determine that additional throttling analysis and/or processing is needed for the data container.

As discussed below with steps 206-208, dynamic data container control computing platform 110 may then perform the additional throttling analysis and/or processing on the data container.

In the illustrative event sequence of FIGS. 2A-2H, dynamic data container control computing platform 110 (and specifically, data container input and analysis module 112a) may, at step 204, perform a first preliminary analysis of the first data container. In one instance, dynamic data container control computing platform 110 may analyze the first data container and the first data container management file to determine whether a first predetermined communication path specified by the first data container management file for transportation of the first data container necessitates additional throttling analysis of the first data container. Specifically, dynamic data container control computing platform 110 may compare the contents of its stored list of communication entities (such as computing systems, communication networks, communication channels, network nodes, dynamic data container control computing platforms, etc.) against the communication entities listed in the first predetermined communication path of the first data container management file of the first data container. Based on this comparing, dynamic data container control computing platform 110 may determine that a first communication entity which the first data container is designated to pass through is included in the stored list. Thus, dynamic data container control computing platform 110 may then determine that the first data container requires additional throttling analysis and/or processing.

In another instance, dynamic data container control computing platform 110 may additionally or alternatively determine, based on the first data container management file, whether the first data container is part of a batch of data being sent by an enterprise organization. Specifically, the dynamic data container control computing platform 110 may analyze the first data container management file to determine whether it contains a batch identification element. If the first data container is part of the batch of data being sent by the enterprise organization (e.g., the first data container management file includes a batch identification element), dynamic data container control computing platform 110 may additionally or alternatively determine that the first data container requires additional throttling analysis and/or processing.

Figure 2B:
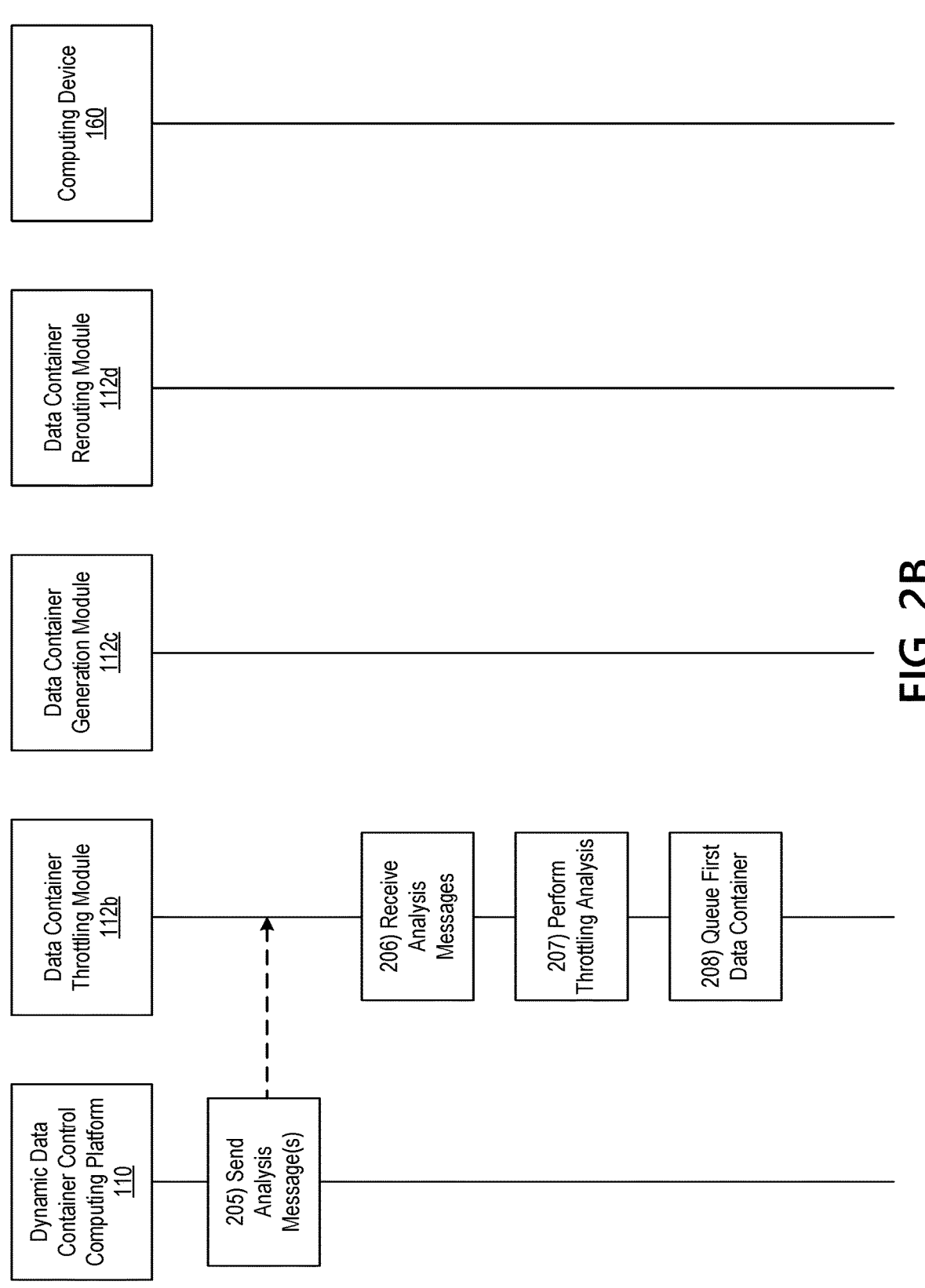
Figure 2C:
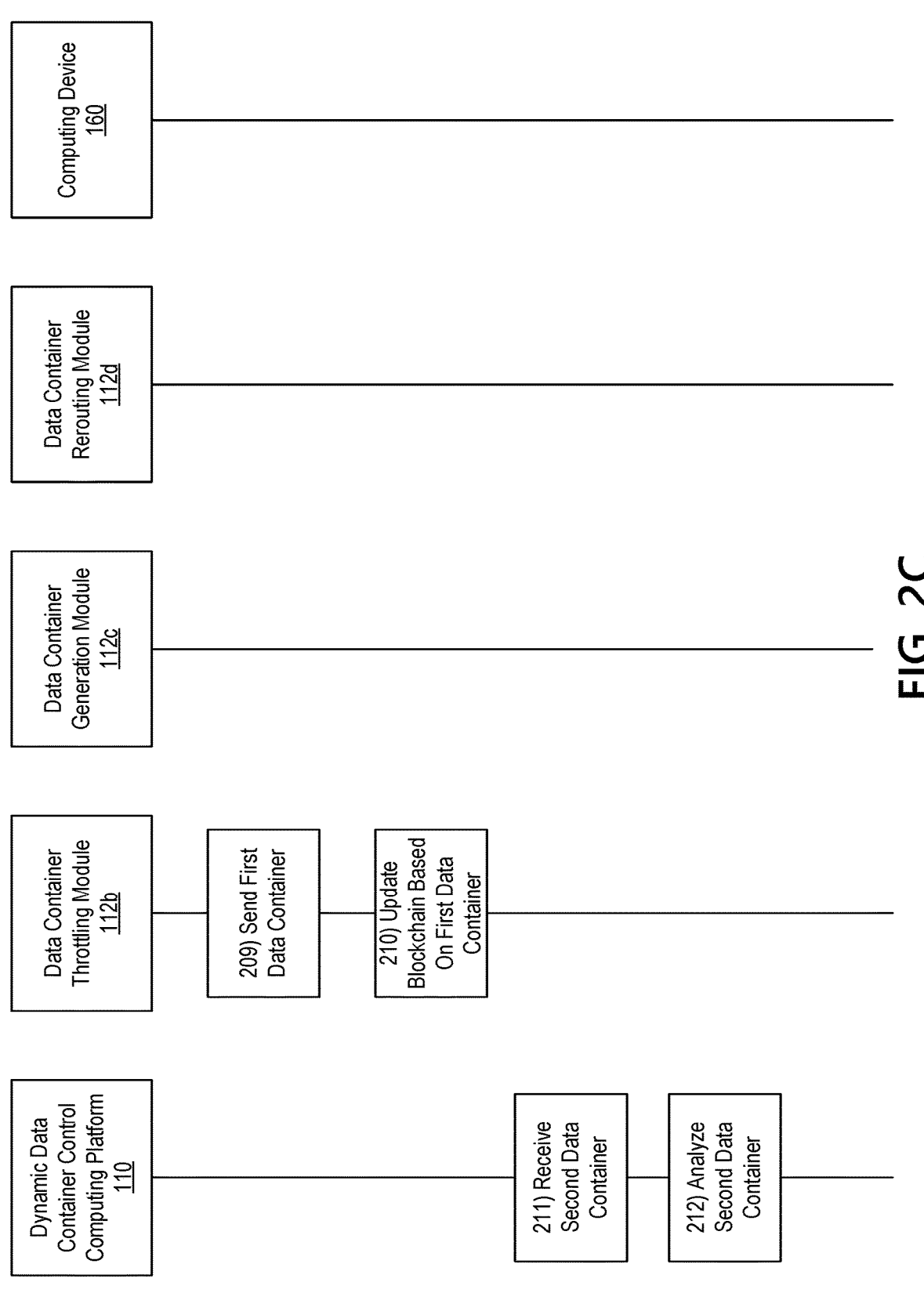

Referring to FIG. 2B, at step 205, dynamic data container control computing platform 110 may send one or more messages to data container throttling module 112b indicating that the first data container needs additional processing by data container throttling module 112b. As discussed above with reference to FIG. 1B, data container throttling module 112b may be a module of dynamic data container control computing platform 110. The one or more messages sent from dynamic data container control computing platform 110 to data container throttling module 112b may indicate the storage location of first data container (e.g., within internal memory 112 of dynamic data container control computing platform 110 or memory that is external to dynamic data container control computing platform 110) and the storage location of first management file (e.g., within internal memory 112 of dynamic data container control computing platform 110 or memory that is external to dynamic data container control computing platform 110). The one or more messages sent from dynamic data container control computing platform 110 to data container throttling module 112b may also indicate the first communication entity (such as computing systems, communication networks, communication channels, network nodes, dynamic data container control computing platforms, etc.) that triggered the throttling analysis and/or processing. The one or more messages sent from dynamic data container control computing platform 110 to data container throttling module 112b may additionally or alternatively indicate that the first data container belongs to a batch of data being sent by or through dynamic data container control computing platform 110 (for example, a batch identification element). The one or more messages sent from dynamic data container control computing platform 110 to data container throttling module 112b may additionally or alternatively indicate whether additional preliminary analysis of the first data container is to be performed by dynamic data container control computing platform 110 after data container throttling module 112b has completed throttling analysis and processing. At step 206, data container throttling module 112b may receive the one or more messages from dynamic data container control computing platform 110. In response to receiving the one or more messages, data container throttling module 112b may retrieve the first data container and/or first management file. Subsequent to sending the one or more messages to data container throttling module 112b regarding additional throttling analysis and/or processing of the first data container, dynamic data container control computing platform 110 may proceed to receiving, storing, and analyzing additional data container management files and/or data containers.

At step 207, data container throttling module 112b may perform throttling analysis of the first data container by analyzing the one or more messages received from dynamic data container control computing platform 110, the first data container, and/or the first data container management file. As discussed above with respect to steps 204 and 205, the one or more messages sent from dynamic data container control computing platform 110 to data container throttling module 112b may indicate the first communication entity and/or batch identification element that triggered the throttling analysis and/or processing. Data container throttling module 112b may extract the identity of the first communication entity and/or batch identification element from the one or more messages. The specifics of the throttling analysis performed by data container throttling module 112b may vary based on the specific communication entity and/or batch identification element that initially triggered the throttling analysis.

As noted above, the communication entity may be computing systems, communication networks, communication channels, network nodes, dynamic data container control computing platforms, etc. In an instance where the throttling analysis and processing was triggered by inclusion of a particular communication entity within the predetermined communication path of the first data container management file of the first data container, the throttling analysis and processing performed by data container throttling module 112b is designed to analyze real-time communication entity operating conditions for factors such as latency, bandwidth, throughput, and processing speed associated with the communication entity and/or transporting the first data container from the dynamic data container control computing platform 110 to the communication entity, and accordingly processing (e.g., throttling) the first data container to prevent overloading at the communication entity.

For example, dynamic data container control computing platform 110 may receive incoming data containers at a high processing speed. A number of those data containers may all be designated to be sent to a same communication entity, such as a computing system, that processes incoming data containers at a lower processing speed. The inclusion of the computing system in the predetermined communication paths of the data container management files associated with each of the incoming data containers may trigger the additional throttling analysis during the preliminary analysis performed by dynamic data container control computing platform 110. Each time data container throttling module 112b receives one of these incoming data containers for throttling analysis (in this first example, receiving the first data container), data container throttling module 112b may, at step 207, retrieve real-time operating conditions for the computing system. Data container throttling module 112b may retrieve the real-time operating conditions from the computing system itself or from a separate third-party system that monitors and provides real-time operating conditions for various communication entities (such as computing systems, communication networks, communication channels, network nodes, dynamic data container control computing platforms, etc.).

Based on the real-time operating conditions of the computing system (such as current processing bandwidth, speed, time, and/or the like), data container throttling module 112b may determine whether the computing system can handle additional incoming data containers for processing. If data container throttling module 112b determines that the computing system can handle additional incoming data containers for processing, data container throttling module 112b may release the first data container for transportation to the computing device. If data container throttling module 112b determines that the computing system cannot handle incoming data containers for processing, then data container throttling module 112b may perform additional throttling processing by queuing the first data container at step 208. Data container throttling module 112b may determine that the computing system cannot handle incoming data containers for processing if one or more of its real-time operating conditions, such as bandwidth, speed, time, and/or the like, are below a threshold. Subsequent to queueing the first data container at step 208, data container throttling module 112b may repeat the throttling analysis of step 207 at regular time intervals until data container throttling module 112b determines that the computing system can handle additional incoming data containers for processing.

For example, data container throttling module 112b may retrieve second real-time operating conditions for the computing system. Data container throttling module 112b may then determine that the second real-time operating conditions indicate that one or more of the second real-time operating conditions, such as bandwidth, latency, throughput, congestion, and/or the like, are above the threshold. In response to this determination, data container throttling module 112b may, at step 209 (referring to FIG. 2C), send the first data container out of the queue. If the one or more messages sent from dynamic data container control computing platform 110 to data container throttling module 112b at step 205 indicated that dynamic data container control computing platform 110 did not need to perform additional preliminary analysis on the first data container after data container throttling module 112b performed the throttling analysis and processing, data container throttling module 112b may, at step 209, send the first data container for transportation to the computing device. If the one or more messages sent from dynamic data container control computing platform 110 to data container throttling module 112b at step 205 indicated that dynamic data container control computing platform 110 did need to perform additional preliminary analysis on the first data container after data container throttling module 112b performed the throttling analysis and processing, data container throttling module 112b may, at step 209, send the first data container (or its storage location) back to data container input and analysis module 112a of dynamic data container control computing platform 110 for additional preliminary analysis. Subsequent to receiving the first data container from data container throttling module 112b, dynamic data container control computing platform 110 may proceed with performing a second preliminary analysis of the first data container as discussed with reference to step 212 and/or performing a third preliminary analysis of the first data container, as discussed with reference to step 224.

In a second example, dynamic data container control computing platform 110 may operate within a first network maintained by an enterprise organization and may regularly have to send incoming data containers through certain external communication networks. The inclusion of one of those communication networks in the predetermined communication paths of the management files associated with each of the incoming data containers may trigger the additional throttling analysis during the preliminary analysis performed by dynamic data container control computing platform 110. Each time data container throttling module 112b receives one of these incoming data containers for throttling analysis (in this second example, receiving the first data container), data container throttling module 112b may, at step 207, retrieve real-time operating conditions for the communication network. Data container throttling module 112b may retrieve the real-time operating conditions from a computing device associated with the communication network or from a separate third-party system that monitors and provides real-time operating conditions for various communication entities (such as computing systems, communication networks, communication channels, network nodes, dynamic data container control computing platforms, etc.). Based on the real-time operating conditions of the communication network (such as current bandwidth, latency, throughput, congestion, and/or the like), data container throttling module 112b may determine whether the communication network can handle additional incoming data containers for transportation. If data container throttling module 112b determines that the communication network can handle additional incoming data containers for transportation, data container throttling module 112b may release the first data container for transportation through the communication network. If data container throttling module 112b determines that the communication network cannot handle additional incoming data containers for transportation, then data container throttling module 112b may perform additional throttling processing by queuing the first data container at step 208.

Data container throttling module 112b may determine that the communication network cannot handle additional incoming data containers for transportation if one or more of its real-time operating conditions, such as bandwidth, latency, throughput, congestion, and/or the like, is below a threshold. Subsequent to queueing the first data container at step 208, data container throttling module 112b may repeat the throttling analysis of step 207 at regular time intervals until data container throttling module 112b determines that the communication network can handle additional incoming data containers for transportation. For example, data container throttling module 112b may retrieve second real-time operating conditions for the communication network. Data container throttling module 112b may then determine that the second real-time operating conditions indicate that one or more of the second real-time operating conditions, such as bandwidth, latency, throughput, congestion, and/or the like, are above the threshold. In response to this determination, data container throttling module 112*b* may, at step 209 (referring to FIG. 2C), send the first data container out of the queue.

If the one or more messages sent from dynamic data container control computing platform 110 to data container throttling module 112*b* at step 205 indicated that dynamic data container control computing platform 110 did not need to perform additional preliminary analysis on the first data container after data container throttling module 112*b* performed the throttling analysis and processing, data container throttling module 112*b* may, at step 209, send the first data container for transportation to the communication network. If the one or more messages sent from dynamic data container control computing platform 110 to data container throttling module 112*b* at step 205 indicated that dynamic data container control computing platform 110 did need to perform additional preliminary analysis on the first data container after data container throttling module 112*b* performed the throttling analysis and processing, data container throttling module 112*b* may, at step 209, send the first data container (or its storage location) back to data container input and analysis module 112*a* of dynamic data container control computing platform 110 for additional preliminary analysis. Subsequent to receiving the first data container from data container throttling module 112*b*, dynamic data container control computing platform 110 may proceed with performing a second preliminary analysis of the first data container as discussed with reference to step 212 and/or performing a third preliminary analysis of the first data container, as discussed with reference to step 224.

In an instance where the throttling analysis and processing of a data container by the data container throttling module 112*b* is triggered by the data container being part of a larger batch of data (e.g., a batch of data containers), the throttling analysis and processing performed by the data container throttling module 112*b* is generally directed to ensuring that the communication channels through which the data container is sent are not overloaded and/or that the destination computing device for the batch of data containers receives the data containers in a preferred order. In a third example, the enterprise organization sending the batch of data containers may use a discrete set of communication channels to transport the batch of data containers. These communication channels are limited in terms of bandwidth and processing capabilities. Thus, the enterprise organization may utilize the dynamic data container control computing platform 110 to ensure that the batches of data containers are transported efficiently and optimally by processing the individual data containers such that the communication channels are not overloaded by the data containers in the batch. The inclusion of the batch identification element in the management file associated with an incoming data container may trigger the additional throttling analysis during the preliminary analysis performed by dynamic data container control computing platform 110. Each time data container throttling module 112*b* receives one of these incoming data containers for throttling analysis (in this third example, receiving the first data container), data container throttling module 112*b* may, at step 207, retrieve real-time operating conditions for the communication channels through which the data container is to be transported. Data container throttling module 112*b* may identify the communication channels from the predetermined communication path of the data container or from batch data associated with the batch identification element.

Data container throttling module 112*b* may retrieve the real-time operating conditions from a computing device associated with the communication channel or from a separate third-party system that monitors and provides real-time operating conditions for various communication entities (such as computing systems, communication networks, communication channels, network nodes, dynamic data container control computing platforms, etc.).

Based on the real-time operating conditions of the communication channels (such as current bandwidth, latency, throughput, congestion, and/or the like), data container throttling module 112*b* may determine whether the communication channels can handle additional incoming data containers for transportation. If data container throttling module 112*b* determines that the communication channel can handle additional incoming data containers for transportation, data container throttling module 112*b* may release the first data container for transportation through the communication channel. If data container throttling module 112*b* determines that the communication channels cannot handle additional incoming data containers for transportation, then data container throttling module 112*b* may perform additional throttling processing by queuing, at step 208, the first data container. Data container throttling module 112*b* may determine that the communication channel cannot handle additional incoming data containers for transportation if one or more of the real-time operating conditions, such as bandwidth, latency, throughput, congestion, and/or the like, are below a threshold. Subsequent to queueing the first data container at step 208, data container throttling module 112*b* may repeat the throttling analysis of step 207 at regular time intervals until data container throttling module 112*b* determines that the communication channel can handle additional incoming data containers for transportation. For example, data container throttling module 112*b* may retrieve second real-time operating conditions for the communication channels through which the data container is to be transported. Data container throttling module 112*b* may then determine that the second real-time operating conditions indicate that one or more of the second real-time operating conditions, such as bandwidth, latency, throughput, congestion, and/or the like, are above the threshold. In response to this determination, data container throttling module 112*b* may, at step 209, release the first data container from the queue.

If the one or more messages sent from dynamic data container control computing platform 110 to data container throttling module 112*b* at step 205 indicated that dynamic data container control computing platform 110 did not need to perform additional preliminary analysis on the first data container after data container throttling module 112*b* performed the throttling analysis and processing, data container throttling module 112*b* may, at step 209, send the first data container for transportation through the communication channel. If the one or more messages sent from dynamic data container control computing platform 110 to data container throttling module 112*b* at step 205 indicated that dynamic data container control computing platform 110 did need to perform additional preliminary analysis on the first data container after data container throttling module 112*b* performed the throttling analysis and processing, data container throttling module 112*b* may, at step 209, send the first data container (or its storage location) back to data container input and analysis module 112*a* of dynamic data container control computing platform 110 for additional preliminary analysis. Subsequent to receiving the first data container from data container throttling module 112*b*, dynamic data container control computing platform 110 may proceed with performing a second preliminary analysis of the first data container as discussed with reference to step 212 and/or performing a third preliminary analysis of the first data container, as discussed with reference to step 224.

In a fourth example, the throttling analysis and processing performed by the data container throttling module 112*b* may be directed to ensuring that the batch of data containers is received in a preferred order by the destination computing system. For example, the destination computing system may need to receive and process a first data container of a batch of data containers before being able to receive and process a second data container of the batch of data containers. As noted above, the enterprise organization may use a discrete set of communication channels to transport the data containers that make up the batch of data. Because each communication channel within this set of communication channels may have different operating characteristics (bandwidth, latency, throughput, etc.), the order in which data containers are input into the various communication channels may be different than the order in which the data containers are output from the various communication channels, which may result in the destination computing system receiving the batch of data containers out of order (and thus, render the destination computing system unable to process certain data containers).

To alleviate this issue, dynamic data container control computing platform 110 may throttle the transportation of certain data containers as needed. Specifically, each time data container throttling module 112*b* has determined, based on the one or more messages from the dynamic data container control computing platform 110 including a batch identification element, that an incoming data container is part of a batch of data (in this the fourth example, in the one or more messages sent in response to the preliminary analysis of the first data container), data container throttling module 112*b* may, at step 207, determine whether the destination computing system is ready to receive the incoming data container. Data container throttling module 112*b* may make this determination by sending the batch identification element and the data container identification number (here, the first data container identification number) to the destination computing system and receiving, from the destination computing system, an indication of whether or not the destination computing system is ready to receive the first data container. In response to determining that the destination computing system is ready to receive the first data container, data container throttling module 112*b* may release the first data container for transportation to the destination computing device. In response to determining that the destination computing device is not ready to receive the first data container, data container throttling module 112*b* may perform additional throttling processing by queuing, at step 208, the first data container for subsequent transportation to the destination computing device. Subsequent to queueing the first data container at step 208, data container throttling module 112*b* may repeat the throttling analysis of step 207 at regular time intervals until data container throttling module 112*b* determines that the destination computing system is ready to receive the first data container. In response to this determination, data container throttling module 112*b* may, at step 209, release the first data container from the queue.

If the one or more messages sent from dynamic data container control computing platform 110 to data container throttling module 112*b* at step 205 indicated that dynamic data container control computing platform 110 did not need to perform additional preliminary analysis on the first data container after data container throttling module 112*b* performed the throttling analysis and processing, data container throttling module 112*b* may, at step 209, send the first data container for transportation through the communication channel to the destination computing device. If the one or more messages sent from dynamic data container control computing platform 110 to data container throttling module 112*b* at step 205 indicated that dynamic data container control computing platform 110 did need to perform additional preliminary analysis on the first data container after data container throttling module 112*b* performed the throttling analysis and processing, data container throttling module 112*b* may, at step 209, send the first data container (or its storage location) back to data container input and analysis module 112*a* of dynamic data container control computing platform 110 for additional preliminary analysis. Subsequent to receiving the first data container from data container throttling module 112*b*, dynamic data container control computing platform 110 may proceed with performing a second preliminary analysis of the first data container as discussed with reference to step 212 and/or performing a third preliminary analysis of the first data container, as discussed with reference to step 224.

At step 210, data container throttling module 112*b* may update a blockchain to indicate that the first data container has been released for transportation and/or to indicate the contents of the first data container. When updating the blockchain to indicate the contents of the first data container, data container throttling module 112*b* may tokenize some or all of the content data of the first data container. For example, if the first data container contains payment information associated with various users, data container throttling module 112*b* can tokenize the payment information (for example, user account numbers) while leaving the user information (such as the name of the user, the address of the user, etc.) un-tokenized.

At step 211, dynamic data container control computing platform 110 may receive a second data container. Steps 211-213, discussed below, may be performed by data container input and analysis module 112*a* of dynamic data container control computing platform 110. Dynamic data container control computing platform 110 may receive the second data container from a communication entity located internal to enterprise computing environment 105 or external to enterprise computing environment 105. The computing device may be another dynamic data container control computing platform. The second data container may be the first data container received by data container input and analysis module 112*a* from data container throttling module 112*b*. Data container throttling module 112*b* may have completed throttling analysis and processing on the first data container at steps 207 and 208 and then sent first data container to data container input and analysis module 112*a* of dynamic data container control computing platform 110 at step 209 in response to determining that the first data container requires additional preliminary analysis by dynamic data container control computing platform 110. The second data container may be received by data container input and analysis module 112*a* of dynamic data container control computing platform 110. In response to receiving the second data container, dynamic data container control computing platform 110 may store the second data container in internal memory (for example, memory 112) or external memory.

At step 212, dynamic data container control computing platform 110 may perform a preliminary analysis of the second data container. The preliminary analysis may be performed by data container input and analysis module 112*a* of dynamic data container control computing platform 110. Dynamic data container control computing platform 110 may perform the preliminary analysis of the second data container using a management file previously received by dynamic data container control computing platform 110 (for example, at step 201). To locate the management file associated with the second data container, dynamic data container control computing platform 110 may first extract a second data container identification element from the second data container. After extracting the second data container identification element from the second data container, dynamic data container control computing platform 110 may compare the second data container identification element to each of the data container identification elements of the data container management files previously stored by dynamic data container control computing platform 110. As a result of the comparing, dynamic data container control computing platform 110 may identify a second management file that is associated with the second data container based on the second management file including a data container identification element that matches the second data container identification element.

The preliminary analysis performed by dynamic data container control computing platform 110 at step 212 may be any combination of one or more of a first preliminary analysis, a second preliminary analysis, or a third preliminary analysis (which are discussed in detail above with reference to step 204). The first preliminary analysis may comprise dynamic data container control computing platform 110 analyzing the second data container and its corresponding second data container management file to determine a second predetermined communication path specified by the corresponding second data container management file for transportation of the second data container necessitates additional throttling analysis of the second data container. A second preliminary analysis additionally or alternatively performed by dynamic data container control computing platform 110 may comprise dynamic data container control computing platform 110 analyzing second data container to determine whether the second data container is complete or whether the second data container is missing one or data sets (and thus requires additional generation processing). A third preliminary analysis additionally or alternatively performed by dynamic data container control computing platform 110 may comprise dynamic data container control computing platform 110 analyzing the second data container management file corresponding to the second data container to determine whether the second data container is part of a regulatory reporting requirement that requires additional rerouting analysis of the second data container.

In the illustrative event sequence of FIGS. 2A-2H, dynamic data container control computing platform 110 may, at step 212, perform the second preliminary analysis of second data container. Specifically, dynamic data container control computing platform 110 may compare, in real-time, the contents of the second data container with the one or more data sets identified by the second data container management file. Dynamic data container control computing platform 110 may perform this comparison by comparing the one or more data set identification numbers listed in the second data container management file with the identification numbers of the one or more data sets in the second data container. Based on this comparing, dynamic data container control computing platform 110 may determine, in real-time, that a first data set associated with a first identification number is missing from the second data container. Based on the real-time determination that the second data container is missing the first data set, dynamic data container control computing platform 110 may determine that the second data container requires additional processing by data container generation module 112c.

Figure 2D:
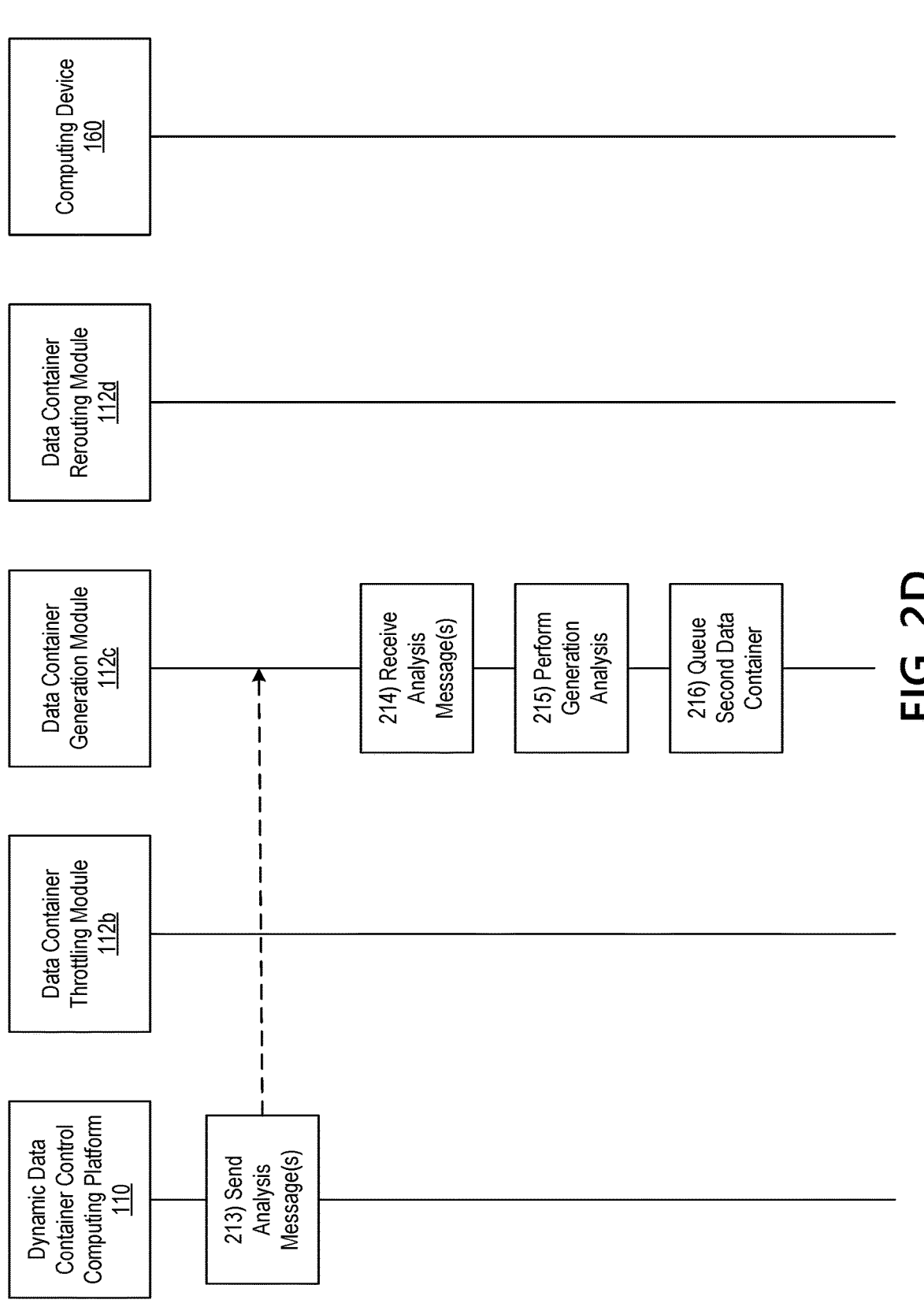

Referring to FIG. 2D, at step 213, dynamic data container control computing platform 110 may send one or more messages to data container generation module 112c indicating that the second data container needs additional processing by data container generation module 112c. As discussed above with reference to FIG. 1B, data container generation module 112c may be a module of dynamic data container control computing platform 110. The one or more messages sent from dynamic data container control computing platform 110 to data container generation module 112c may indicate the storage location of the second data container (e.g., within internal memory 112 of dynamic data container control computing platform 110 or memory that is external to dynamic data container control computing platform 110) and the storage location of the second data container management file (e.g., within internal memory 112 of dynamic data container control computing platform 110 or memory that is external to dynamic data container control computing platform 110). The one or more messages sent from dynamic data container control computing platform 110 to data container generation module 112c may also indicate the first identification number of the first data set that is missing from the second data container. The one or more messages sent from dynamic data container control computing platform 110 to data container generation module 112c may additionally or alternatively indicate whether additional preliminary analysis of the second data container is to be performed by dynamic data container control computing platform 110 after data container generation module 112c has completed generation analysis and processing. At step 214, data container generation module 112c may receive the one or more messages from dynamic data container control computing platform 110. In response to receiving the one or messages, data container generation module 112c may retrieve the second data container and/or the second data container management file. Subsequent to sending the one or more messages to data container generation module 112c regarding additional processing of the second data container, dynamic data container control computing platform 110 may proceed to receiving, storing, and analyzing additional data container management files and/or data containers.

At step 215, data container generation module 112c may perform generation analysis of the second data container by analyzing the one or more messages received from dynamic data container control computing platform 110, the second data container, and/or the second data container management file. As discussed above with respect to step 213, the one or more messages sent from dynamic data container control computing platform 110 to data container generation module 112c may indicate the first identification number of the first data set that was determined to be missing by dynamic data container control computing platform 110 during the preliminary analysis of the second data container. Data container generation module 112c may extract the first identification number from the one or more messages. Data container generation module 112c may further analyze the second data container management file to determine the source computing device from which the first data set will be received.

At step 216, data container generation module 112c may queue the second data container while data container generation module 112c retrieves the first data set from the source computing device, such as computing device 160.

Figure 2E:
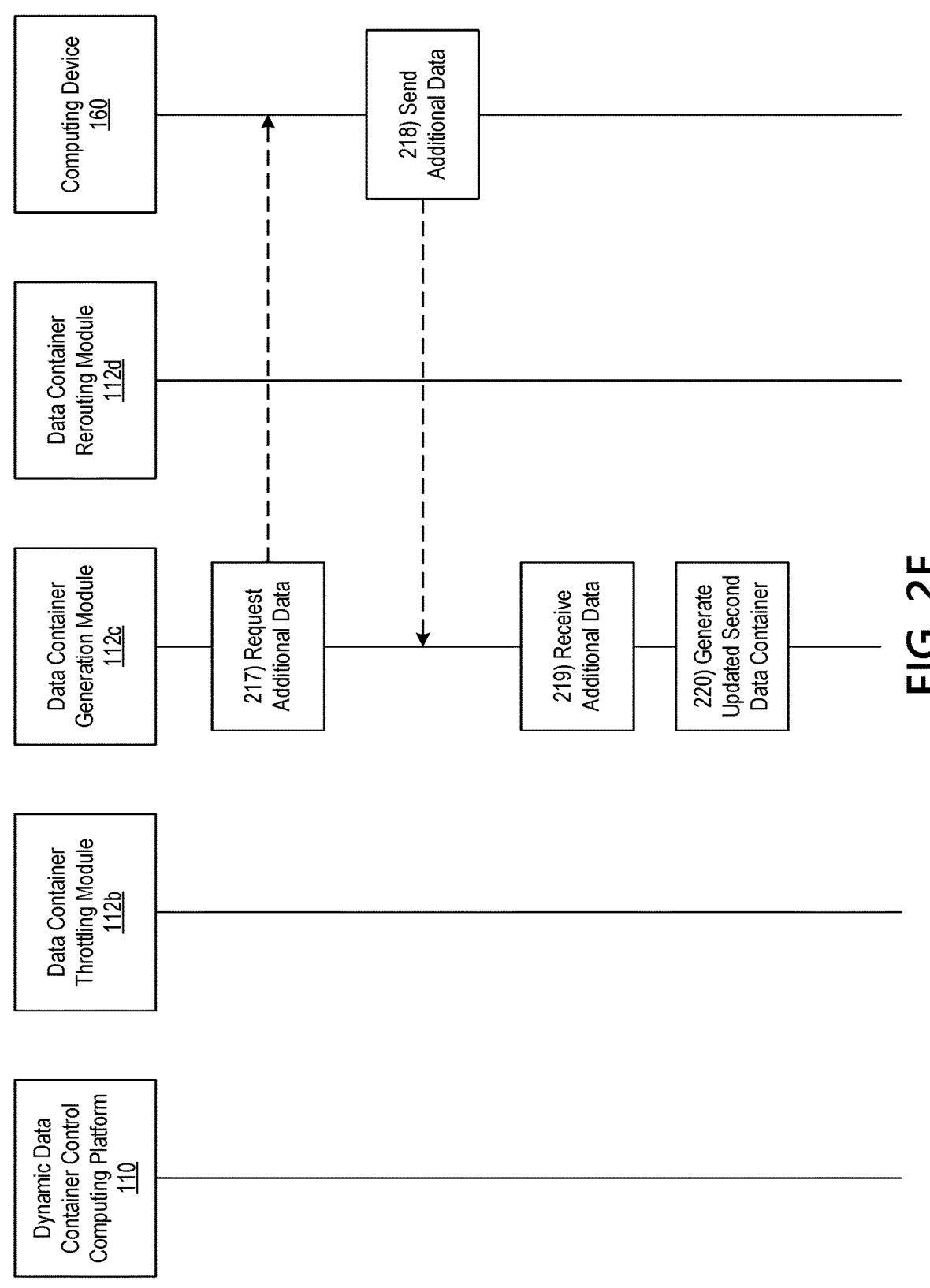
Figure 2F:
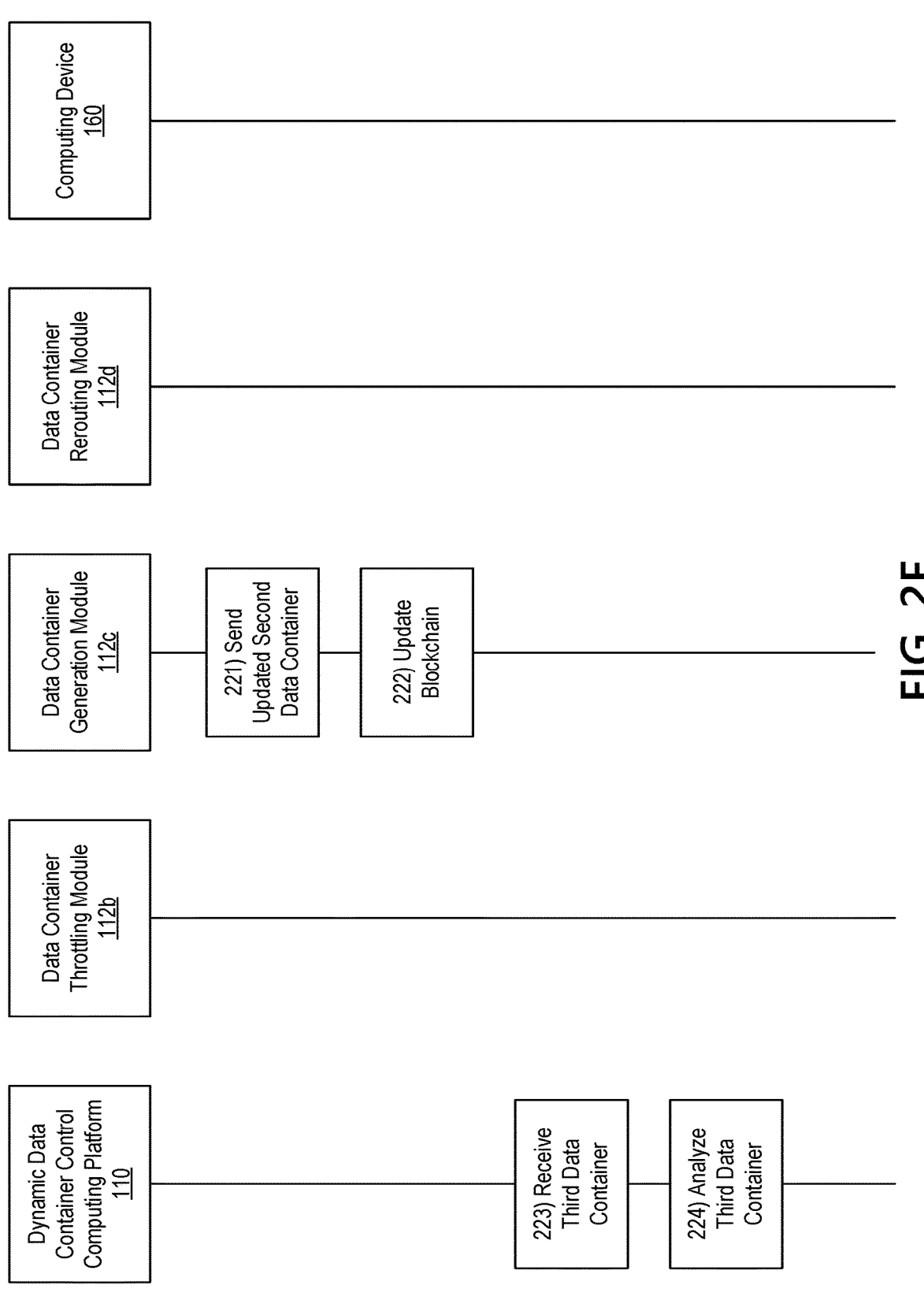

Referring to FIG. 2E, at step 217 data container generation module 112*c* may request the first data set from computing device 160. To request the first data container from computing device 160, data container generation module 112*c* may send one or more messages to computing device 160, the one or more messages comprising at least the first identification number of the first data set. At step 218, in response to receiving the request for the first data set from data container generation module 112*c*, computing device 160 may send the first data set (or a storage location of the first data set) to data container generation module 112*c*. At step 219, data container generation module 112*c* may receive the first data set from computing device 160. In a scenario where computing device 160 sends the storage location of the first data set, data container generation module 112*c* may alternatively, at step 219, retrieve the first data set from its storage location. At step 220, data container generation module 112*c* may generate an updated second data container. Data container generation module 112*c* may generate the updated second data container by supplementing the second data container with the first data set. Referring to FIG. 2F, at step 221, data container generation module 112*c* may send the updated second data container out of the queue.

If the one or more messages sent from dynamic data container control computing platform 110 to data container generation module 112*c* at step 215 indicated that dynamic data container control computing platform 110 did not need to perform additional preliminary analysis on the second data container after data container generation module 112*c* performed the generation analysis and processing, data container throttling module 112*b* may, at step 221, send the updated second data container for transportation to the next destination for the second data container. To determine the next destination for the second data container, data container generation module 112*c* may analyze the second predetermined communication path of the second data container management file associated with the second data container. If the one or more messages sent from dynamic data container control computing platform 110 to data container throttling module 112*b* at step 215 indicated that dynamic data container control computing platform 110 did need to perform additional preliminary analysis on the second data container after data container generation module 112*c* performed the generation analysis and processing, data container generation module 112*c* may, at step 221, send the updated second data container (or its storage location) back to data container input and analysis module 112*a* of dynamic data container control computing platform 110 for additional preliminary analysis. Subsequent to receiving the updated second data container from data container generation module 112*c*, dynamic data container control computing platform 110 may proceed with performing a first preliminary analysis of the second data container as discussed with reference to step 204 and/or performing a third preliminary analysis of the second data container, as discussed with reference to step 224.

At step 222, data container generation module 112*c* may update a blockchain to indicate that the second data container has been released for transportation and/or to indicate the contents of the second data container. When updating the blockchain to indicate the contents of the second data container, data container throttling module 112*b* may tokenize some or all of the content data of the second data container. For example, if the second data container contains payment information associated with various users, data container throttling module 112*b* can tokenize the payment information (for example, user account numbers) while leaving the user information (such as the name of the user, the address of the user, etc.) un-tokenized.

Although the illustrative event sequence of FIGS. 2A-2H shows data container generation module 112*c* retrieving only one missing data set from one computing system, it is understood that data container generation module 112*c* may retrieve multiple data sets from multiple computing system if it is determined, at step 212, that multiple data sets are missing from the data container. The data container may remain queued while each of the missing data sets is retrieved. Data container throttling module 112*b* may generate an updated data container each time a missing data set is received (and then re-queue the data container) or may wait until all of the missing data sets are received to perform a single supplementation of the data container with all of the missing data sets to generate the updated data container.

Moreover, data container generation module 112*c* may limit the amount of time allotted to the source computing system for providing the missing data set. Data container generation module 112*c* may inform the source computing system of the allotted time in one or more messages that are sent from data container generation module 112*c* to the source computing system (for example, at step 217). If the source computing system fails to provide the missing data set within the allotted time, data container generation module 112*c* may either send the data container in its current form (e.g., without supplementing the data container with the missing data set(s)) or may terminate the communication of the data container. In the latter case, data container generation module 112*c* (or another module of dynamic data container control computing platform 110) may notify the originating source of the data container that communication of the data container has been terminated due to failure to receive the missing data set in the allotted time.

At step 223, dynamic data container control computing platform 110 may receive a third data container. Steps 223-225, discussed below, may be performed by data container input and analysis module 112*a* of dynamic data container control computing platform 110. Dynamic data container control computing platform 110 may receive the third data container from a communication entity located internal to enterprise computing environment 105 or external to enterprise computing environment 105. In one instance, the computing device may be another dynamic data container control computing platform. In one instance, the third data container may be the first data container received by data container input and analysis module 112*a* from data container throttling module 112*b*. Data container throttling module 112*b* may have completed throttling analysis and processing on the first data container at steps 207 and 208 and then sent first data container to data container input and analysis module 112*a* of dynamic data container control computing platform 110 at step 209 in response to determining that the first data container requires additional preliminary analysis by dynamic data container control computing platform 110. In yet another instance, the third data container may be the second data container received by data container input and analysis module 112*a* from data container generation module 112*c*. Data container throttling module 112*b* may have completed generation analysis and processing on the second data container at steps 219 and 220 and then sent second data container to data container input and analysis module 112*a* of dynamic data container control computing platform 110 at step 221 in response to determining that the second data container requires additional preliminary analysis by dynamic data container control computing platform 110. The third data container may be received by data container input and analysis module 112*a* of dynamic data container control computing platform 110 at step 223. In response to receiving the third data container, dynamic data container control computing platform 110 may store the third data container in internal memory (for example, memory 112) or external memory.

At step 224, dynamic data container control computing platform 110 may perform a preliminary analysis of the third data container. The preliminary analysis may be performed by data container input and analysis module 112*a* of dynamic data container control computing platform 110. Dynamic data container control computing platform 110 may perform the preliminary analysis of the third data container using a management file previously received by dynamic data container control computing platform 110 (for example, at step 201). To locate the management file associated with the third data container, dynamic data container control computing platform 110 may first extract a third data container identification element from the third data container. After extracting the third data container identification element from the third data container, dynamic data container control computing platform 110 may compare the third data container identification element to each of the data container identification elements of the data container management files previously stored by dynamic data container control computing platform 110. As a result of the comparing, dynamic data container control computing platform 110 may identify a third management file that is associated with the third data container based on the third management file including a data container identification element that matches the third data container identification element.

The preliminary analysis performed by dynamic data container control computing platform 110 at step 224 may be any combination of one or more of a first preliminary analysis, a second preliminary analysis, or a third preliminary analysis (which are discussed in detail above with reference to step 204). The first preliminary analysis may comprise dynamic data container control computing platform 110 analyzing the third data container and its corresponding third data container management file to determine whether a third predetermined communication path specified by the corresponding third data container management file for transportation of the third data container necessitates additional throttling analysis of the third data container. A second preliminary analysis additionally or alternatively performed by dynamic data container control computing platform 110 may comprise dynamic data container control computing platform 110 analyzing third data container to determine whether the third data container is complete or whether the third data container is missing one or data sets, which would require additional generation processing of the second data container. A third preliminary analysis additionally or alternatively performed by dynamic data container control computing platform 110 may comprise dynamic data container control computing platform 110 analyzing the third data container management file corresponding to the third data container to determine whether the third data container is part of a regulatory reporting requirement that requires rerouting analysis of the third data container.

In the illustrative event sequence of FIGS. 2A-2H, dynamic data container control computing platform 110 may, at step 224, perform the third preliminary analysis of the third data container. Specifically, dynamic data container control computing platform 110 may analyze the third data container management file corresponding to the third data container to determine whether the third data container is part of a regulatory reporting requirement that requires rerouting analysis of the third data container. In this scenario, the third data container may be sent by an enterprise organization to maintain compliance with the regulations of a third-party organization, such as a regulatory body. The regulatory body may regularly or intermittently send updated requirements for the contents of the third data container or the transportation of the third data container. In this instance, dynamic data container control computing platform 110 may determine, based on the third data container management file, that regulatory analysis or processing is required for the third data container before it may be forwarded to the next communication entity (such as computing systems, communication networks, communication channels, network nodes, dynamic data container control computing platforms, etc., as stipulated by a third predetermined communication path of the corresponding third data container management file). Dynamic data container control computing platform 110 may additionally identify the specific regulation with which the third data container is associated. For example, the third data container management file may indicate a regulation identification number identifying the specific regulation associated with the third data container.

Figure 2G:
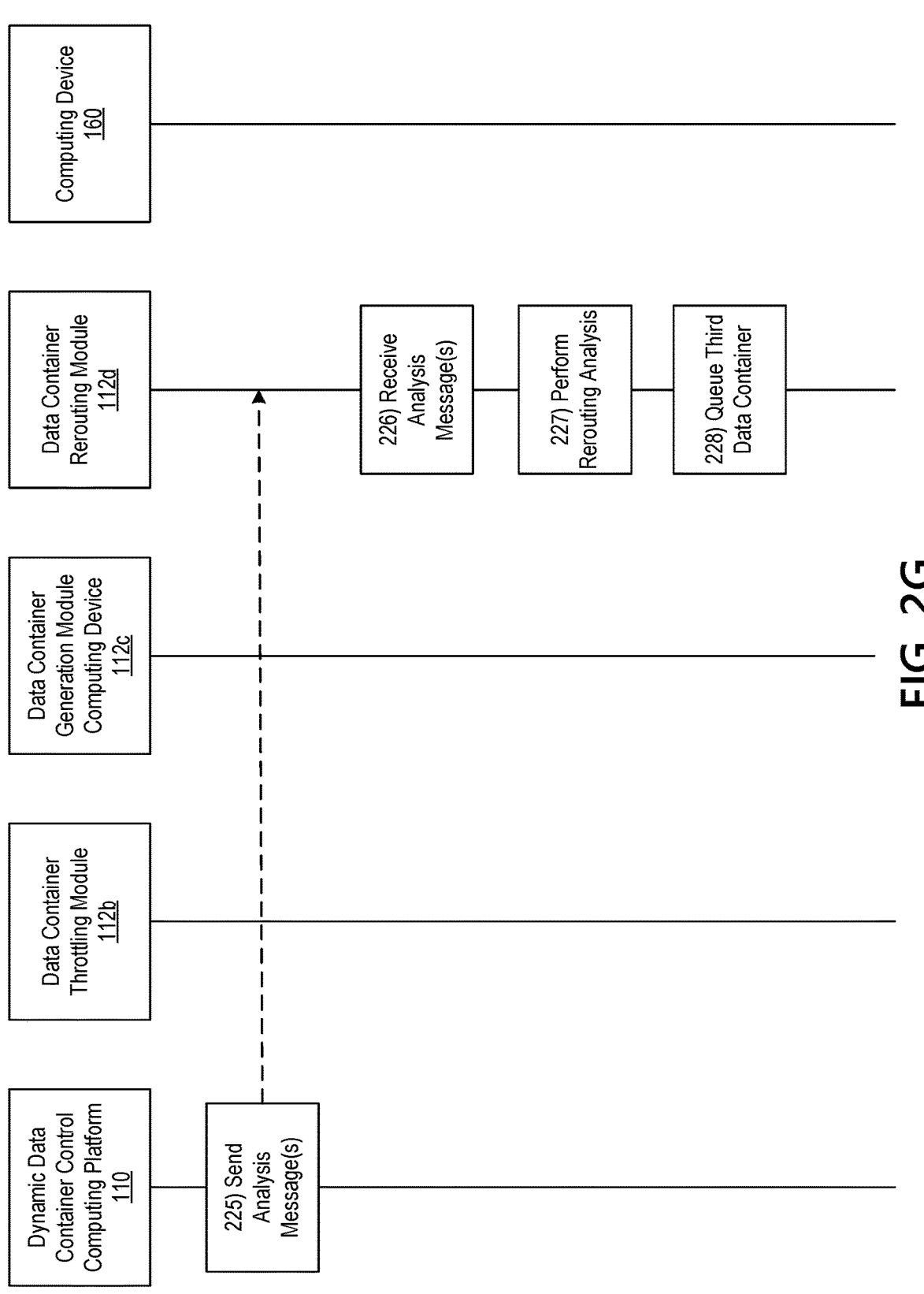
Figure 2H:
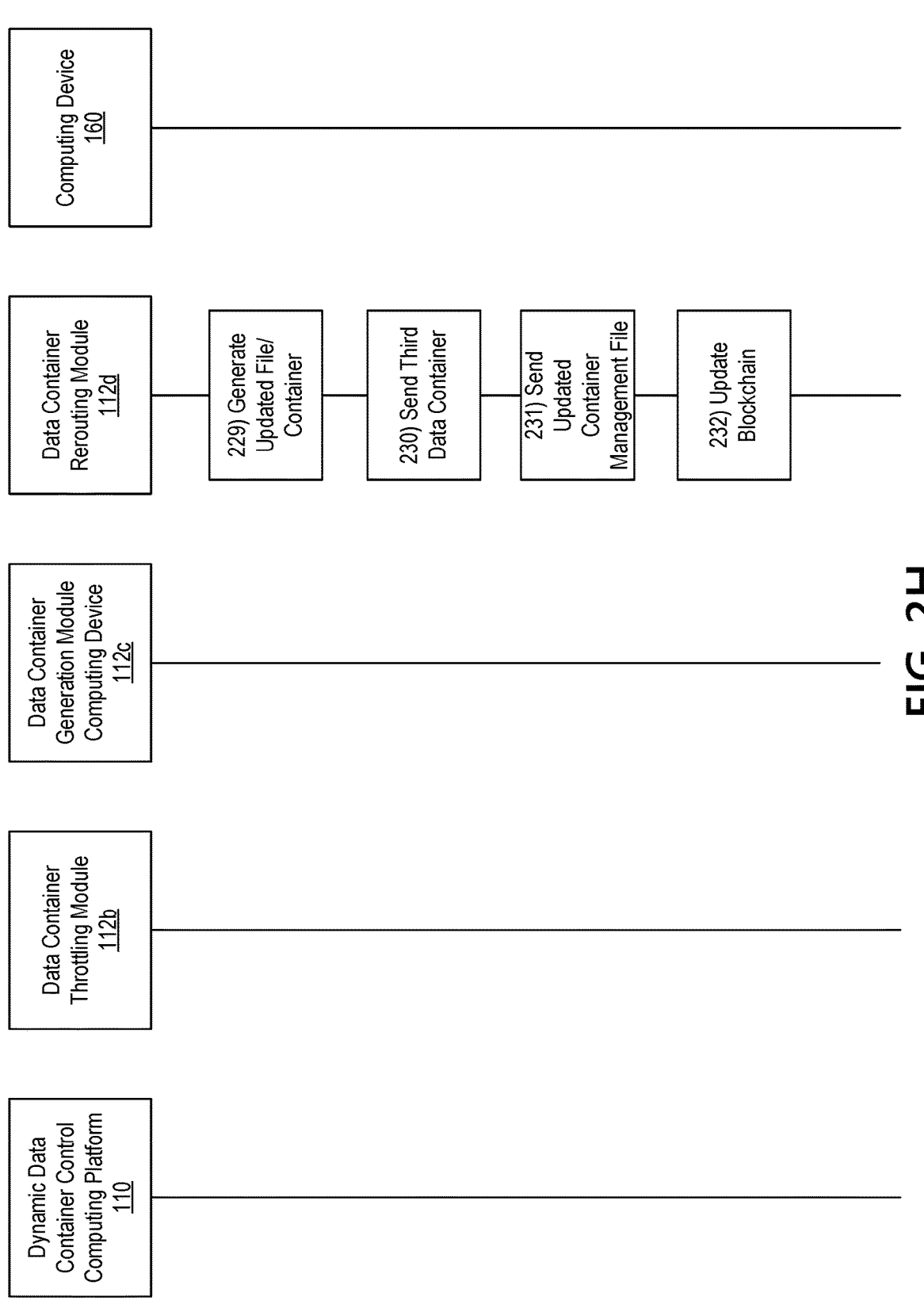

Referring to FIG. 2G, at step 225, dynamic data container control computing platform 110 may send one or more messages to data container rerouting module 112*d* indicating that the third data container needs additional processing by data container rerouting module 112*d*. As discussed above with reference to FIG. 1B, data container rerouting module 112*d* may be a module of dynamic data container control computing platform 110. The one or more messages sent from dynamic data container control computing platform 110 to data container generation module 112*c* may indicate the storage location of the third data container (e.g., within internal memory 112 of dynamic data container control computing platform 110 or memory that is external to dynamic data container control computing platform 110) and the storage location of third data container management file (e.g., within internal memory 112 of dynamic data container control computing platform 110 or memory that is external to dynamic data container control computing platform 110). The one or more messages sent from dynamic data container control computing platform 110 to data container generation module 112*c* may also indicate the regulation identification number identifying the specific regulation associated with the third data container. The one or more messages sent from dynamic data container control computing platform 110 to data container rerouting module 112*d* may additionally or alternatively indicate whether additional preliminary analysis of the third data container is to be performed by dynamic data container control computing platform 110 after data container rerouting module 112*d* has completed rerouting analysis and processing. At step 226, data container rerouting module 112*d* may receive the one or more messages from dynamic data container control computing platform 110. In response to receiving the one or messages, data container rerouting module 112*d* may retrieve the third data container and/or third data container management file. Subsequent to sending the one or more messages to data container rerouting module 112*d* regarding additional processing of the third data container, dynamic data container control computing platform 110 may proceed to receiving, storing, and analyzing additional data container management files and/or data containers.

At step 227, data container rerouting module 112d may perform rerouting analysis of the third data container by analyzing the one or more messages received from dynamic data container control computing platform 110, the third data container, and/or the third data container management file. As indicated above, the one or more messages sent from dynamic data container control computing platform 110 to data container rerouting module 112d may include the regulation identification number identifying the specific regulation associated with the third data container. Data container rerouting module 112d may extract the regulation identification number from the one or more messages. Alternatively, data container rerouting module 112d may extract the regulation identification number from the third data container management file associated with the third data container. Data container rerouting module 112d may then retrieve real-time authorization data associated with the regulation identification number. The real-time authorization data may include data identifying one or more communication entities through with the third data container may not pass, data identifying one or more data sets that must be included in the third data container, and/or the like. If the real-time authorization data includes data identifying one or more communication entities through with the third data container may not pass, data container rerouting module 112d may compare the third predetermined communication path of the third data container management file of the third data container with the one or more communication entities identified in the real-time authorization data. If the third predetermined communication path includes any of the one or more communication entities identified in the real-time authorization data, data container rerouting module 112d may determine that the third data container requires additional rerouting process. If the real-time authorization data includes data identifying one or more data sets that must be included in the third data container, data container rerouting module 112d may compare the one or more data sets identified in the real-time authorization data with the one or more data sets in the third data container. If the data container rerouting module 112d determines, based on this comparing, that the third data container is missing any of the one or more data sets identified by the real-time authorization data, data container rerouting module 112d may determine that the third data container requires additional rerouting processing.

At step 228, data container rerouting module 112d may queue the third data container while data container rerouting module 112d performs the rerouting processing. If, at step 227, data container rerouting module 112d determined that the third predetermined communication path includes any of the one or more communication entities identified in the real-time authorization data, data container rerouting module 112d may, at step 229 (referring to FIG. 2H), generate an updated third data container management file. Specifically, data container rerouting module 112d may determine an updated communication route for transportation of the third data container management file, wherein the updated route does not include any of the one or more communication entities identified in the real-time authorization data. Data container rerouting module 112d may then update the third predetermined communication path of the third data container management file by replacing the current communication route (e.g., communication entities through which the third data container is configured to pass) with the updated communication route. If, at step 227, data container rerouting module 112d additionally or alternatively determined that the third data container is missing any of the one or more data sets identified by the real-time authorization data, data container rerouting module 112d may additionally or alternatively retrieve, at step 229, the one or more missing data sets and generate an updated third data container. Data container rerouting module 112d may retrieve the one or more missing data sets by requesting the one or more missing data sets from one or more source computing devices. In response to receiving the requests for the one or more missing data sets from data container rerouting module 112d, the source computing devices may send the one or missing data sets (or storage locations of the one or more missing data sets) to data container rerouting module 112d. Data container rerouting module 112d may receive the one or more missing data sets from the one or more source computing devices. In a scenario where the one or more source computing devices sends the storage locations of the one or more missing data sets, data container rerouting module 112d may alternatively retrieve the one or more missing data sets from the storage locations. Data container rerouting module 112d may then generate an updated third data container by supplementing the third data container with the one or more data sets received from the one or more source computing devices.

At step 230, data container rerouting module 112d may send the updated third data container from the queue. If the one or more messages sent from dynamic data container control computing platform 110 to data container rerouting module 112d at step 225 indicated that dynamic data container control computing platform 110 did not need to perform additional preliminary analysis on the third data container after data container rerouting module 112d performed the rerouting analysis and processing, data container rerouting module 112d may, at step 230, send the updated third data container for transportation to the next destination for the third data container. To determine the next destination for the updated third data container, data container rerouting module 112d may analyze the third predetermined communication path (which may have been updated at step 229) of the third data container management file associated with the updated third data container. If the one or more messages sent from dynamic data container control computing platform 110 to data container rerouting module 112d at step 225 indicated that dynamic data container control computing platform 110 did need to perform additional preliminary analysis on the third data container after data container rerouting module 112d performed the rerouting analysis and processing, data container rerouting module 112d may, at step 230, send the third data container (or its storage location) back to data container input and analysis module 112a of dynamic data container control computing platform 110 for additional preliminary analysis. Subsequent to receiving the third data container from data container rerouting module 112d, dynamic data container control computing platform 110 may proceed with performing a first preliminary analysis of the third data container as discussed with reference to step 204 and/or performing a second preliminary analysis of the third data container, as discussed with reference to step 212. At step 231, data container rerouting module 112d may send the updated third data container management file. Data container rerouting module 112d may send the updated third data container management file to data container input and analysis module 112a of dynamic data container control computing platform 110. Data container rerouting module 112d may additionally or alternatively send the updated third data container management file to any additional dynamic data container control computing platforms included in the third predetermined communication path of the updated third data container management file.

At step 232, data container rerouting module 112d may update a blockchain to indicate that the third data container has been released for transportation and/or to indicate the contents of the third data container. When updating the blockchain to indicate the contents of the third data container, data container throttling module 112b may tokenize some or all of the content data of the third data container. For example, if the third data container contains payment information associated with various users, data container throttling module 112b can tokenize the payment information (for example, user account numbers) while leaving the user information (such as the name of the user, the address of the user, etc.) un-tokenized.

Figure 3A:
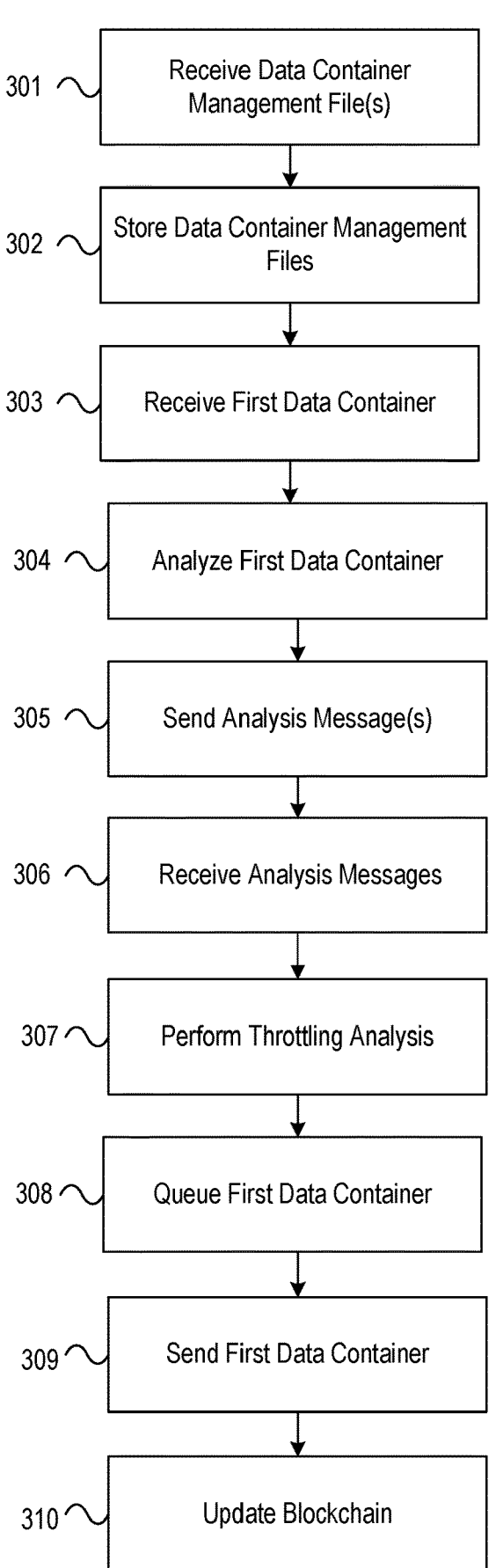
FIGS. 3A-3C depict an illustrative method for implementing a dynamic data container control computing platform in accordance with one or more example embodiments.
Figure 3B:
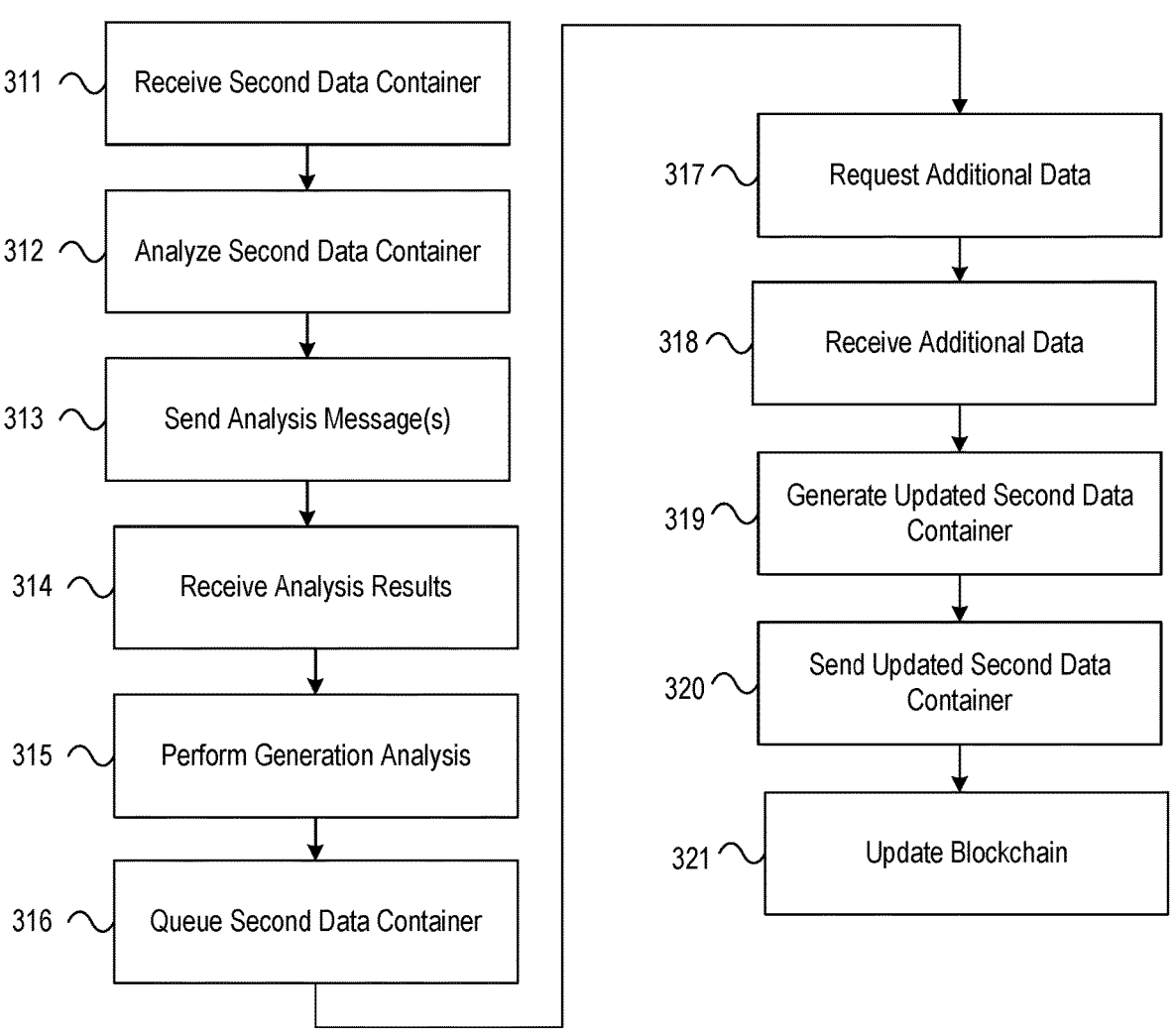
Figure 3C:
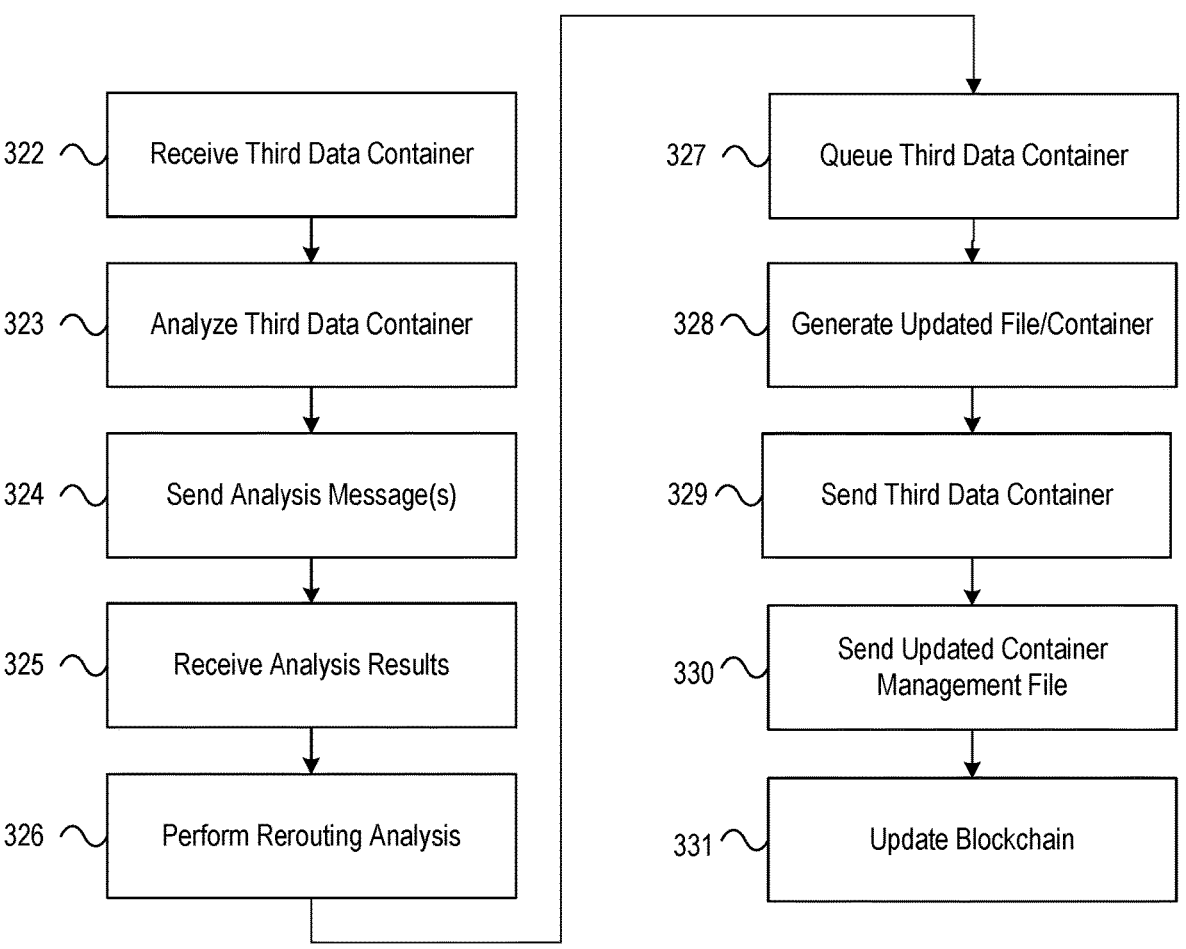

FIGS. 3A-3C depict an illustrative method for implementing a dynamic data container control computing platform in accordance with one or more example embodiments. Referring to FIG. 3A, at step 301, a data container input and analysis module, part of the dynamic data container control computing platform and having at least one processor, a communication interface, and memory, may receive one or more data container management files. At step 302, data container input and analysis module may store the one or more data container management files in internal or external memory. At step 303, data container input and analysis module may receive a first data container. At step 304, data container input and analysis module may analyze the first data container based on the contents of the first data container and a first data container management file associated with the first data container. Data container input and analysis module may analyze the first data container by performing any combination of a first preliminary analysis, a second preliminary analysis, or a third preliminary analysis, in any order. The first preliminary analysis may comprise data container input and analysis module analyzing the first data container and its corresponding first data container management file to determine whether a first predetermined communication path specified by the corresponding first data container management file for transportation of the first data container necessitates additional throttling analysis of the first data container. A second preliminary analysis additionally or alternatively performed by data container input and analysis module may comprise data container input and analysis module analyzing the first data container to determine whether the first data container is complete or whether the first data container is missing one or data sets, which would require additional generation processing of the first data container. A third preliminary analysis additionally or alternatively performed by data container input and analysis module may comprise data container input and analysis module analyzing the first data container management file corresponding to the first data container to determine whether the first data container is part of a regulatory reporting requirement that requires additional rerouting analysis of the first data container. In the illustrative method shown in FIGS. 3A-3C, data container input and analysis module may perform the first preliminary analysis at step 304.

At step 305, data container input and analysis module may send one or more analysis messages to data container throttling module of the dynamic data container control computing platform. Data container throttling module of the dynamic data container control computing platform may have at least one processor, a communication interface, and memory. At step 306, data container throttling module may receive the one or more analysis messages. At step 307, data container throttling module may perform throttling analysis on the first data container. At step 308, data container throttling module may queue the first data container while data container throttling module performs throttling processing of the first data container. At step 309, data container throttling module may send the first data container from the queue. At step 310, data container throttling module may update a blockchain based on the first data container.

Referring to FIG. 3B, at step 311, a data container input and analysis module, part of the dynamic data container control computing platform and having at least one processor, a communication interface, and memory, may receive a second data container. At step 312, the data container input and analysis module may analyze the second data container based on the contents of the second data container and a second data container management file associated with the second data container. The data container input and analysis module may analyze the second data container by performing any combination of a first preliminary analysis, a second preliminary analysis, or a third preliminary analysis, in any order, which are discussed above with reference to step 304. In the illustrative method shown in FIGS. 3A-3C, the data container input and analysis module may perform the second preliminary analysis at step 312. At step 313, the data container input and analysis module may send one or more analysis messages to data container generation module of the dynamic data container control computing platform. The data container generation module of the dynamic data container control computing platform may have at least one processor, a communication interface, and memory. At step 314, the data container generation module may receive the one or more analysis messages. At step 315, the data container generation module may perform generation analysis on the second data container. At step 316, the data container generation module may queue the second data container while data container generation module performs generation processing of the second data container. At step 317, the data container generation module may request one or more additional data sets from one or more source computing devices. At step 318, the data container generation module may receive the one or more additional data sets from the one or more source computing devices. At step 319, the data container generation module may generate an updated second data container based on the one or more additional data sets. At step 320, the data container generation module may send the updated second data container from the queue. At step 321, the data container throttling module may update a blockchain based on the updated second data container.

Referring to FIG. 3C, at step 322, a data container input and analysis module, part of the dynamic data container control computing platform and having at least one processor, a communication interface, and memory, may receive a third data container. At step 323, the data container input and analysis module may analyze the third data container based on the third data container and a third data container management file associated with the third data container. The data container input and analysis module may analyze the third data container by performing any combination of a first preliminary analysis, a second preliminary analysis, or a third preliminary analysis, in any order, which are discussed above with reference to step 304. In the illustrative method shown in FIGS. 3A-3C, the data container input and analysis module may perform the third preliminary analysis at step 323. At step 324, the data container input and analysis module may send one or more analysis messages to data container rerouting module of the dynamic data container control computing platform. The data container rerouting module of the dynamic data container control computing platform may have at least one processor, a communication interface, and memory. At step 325, the data container rerouting module may receive the one or more analysis messages. At step 326, the data container rerouting module may perform rerouting analysis on the third data container. At step 327, the data container rerouting module may queue the third data container while data container rerouting module performs rerouting processing of the third data container. At step 328, the data container rerouting module may generate an updated third data container and/or an updated third data container management file. At step 329, the data container rerouting module may send the updated third data container from the queue. At step 330, the data container rerouting module may send the updated third data container management file. At step 331, the data container rerouting module may update a blockchain based on the updated third data container.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:

at least one processor;

a communication interface communicatively coupled to the at least one processor; and memory storing computer-readable instructions that, when executed by the at least one processor, cause the computing platform to:

receive, by a data container input and analysis module, one or more data container management files, each management file of the one or more data container management files being associated with a different data container;

store, by the data container input and analysis module, the one or more data container management files;

receive, by the data container input and analysis module, a first data container;

retrieve, by the data container input and analysis module, a first data container management file of the one or more data container management files, wherein the first data container management file is associated with the first data container;

perform, by the data container input and analysis module, a first preliminary analysis of the first data container, wherein the first preliminary analysis comprises analyzing the first data container and the first data container management file to determine whether the first data container is complete or incomplete;

in response to determining that the first data container is incomplete, send one or more analysis messages to a data container generation module;

receive, by the data container generation module, the one or more analysis messages;

queue, by the data container generation module, the first data container;

retrieve, by the data container generation module and from the one or more analysis messages, an identification element associated with a missing data set;

send, by the data container generation module and to a source computing device, an amount of time allotted to the source computing device for providing the missing data set;

retrieve, by the data container generation module and from the source computing device, the missing data set; and generate, by the data container generation module, an updated first data container by supplementing the first data container with the missing data set.

2. The computing platform of claim 1, wherein determining whether the first data container is complete or incomplete comprises comparing one or more identification elements in the first data container management file with one or more identification elements in the first data container.

3. The computing platform of claim 2, wherein determining that the first data container is incomplete comprises determining that a first identification element from the first data container management file is missing from the first data container.

4. The computing platform of claim 3, wherein the one or more analysis messages comprises the first identification element.

5. The computing platform of claim 3, wherein the first identification element is sent to the source computing device.

6. The computing platform of claim 1, wherein the memory stores additional computer-readable instructions that, when executed by the at least one processor, cause the computing platform to:

send the first data container from the queue.

7. The computing platform of claim 6, wherein the sending the first data container from the queue comprises:

determining, by the data container generation module and based on the one or more analysis messages, that the first data container needs additional preliminary analysis; and sending, by the data container generation module and to the data container input and analysis module, the first data container.

8. The computing platform of claim 3, wherein the memory stores additional computer-readable instructions that, when executed by the at least one processor, cause the computing platform to:

receive, by the data container input and analysis module and from the data container generation module, the first data container;

determine, by the data container input and analysis module, that a second preliminary analysis is to be performed on the first data container; and perform, by the data container input and analysis module, the second preliminary analysis.

9. The computing platform of claim 8, wherein the second preliminary analysis comprises analyzing the first data container management file to determine whether rerouting analysis is required for the first data container.

10. The computing platform of claim 8, wherein the second preliminary analysis comprises analyzing the first data container and the first data container management file to determine whether a first predetermined communication path of the first data container management file requires additional throttling analysis of the first data container.

11. A method comprising:

at a computing platform comprising at least one processor, a communication interface, and memory:

receiving, by a data container input and analysis module, a first data container;

retrieving, by the data container input and analysis module, a first data container management file associated with the first data container;

performing, by the data container input and analysis module, a first preliminary analysis of the first data container, wherein the first preliminary analysis comprises analyzing the first data container and the first data container management file to determine whether the first data container is complete or incomplete;

in response to determining that the first data container is incomplete, sending one or more analysis messages to a data container generation module;

receiving, by the data container generation module, the one or more analysis messages;

queuing, by the data container generation module, the first data container;

retrieving, by the data container generation module and from the one or more analysis messages, an identification element associated with a missing data set;

send, by the data container generation module and to a source computing device, an amount of time allotted to the source computing device for providing the missing data set;

retrieving, by the data container generation module and from the source computing device, the missing data set; and generating, by the data container generation module, an updated first data container by supplementing the first data container with the missing data set.

12. The method of claim 11, wherein determining whether the first data container is complete or incomplete comprises comparing one or more identification elements in the first data container management file with one or more identification elements in the first data container.

13. The method of claim 12, wherein determining that the first data container is incomplete comprises determining that a first identification element from the first data container management file is missing from the first data container.

14. The method of claim 13, wherein the one or more analysis messages comprises the first identification element.

15. The method of claim 13, wherein the first identification element is sent to the source computing device.

16. The method of claim 11, further comprising:

determining, by the data container generation module and based on the one or more analysis messages, that the first data container needs additional preliminary analysis;

sending, by the data container generation module and to the data container input and analysis module, the first data container;

receiving, by the data container input and analysis module and from the data container generation module, the first data container; and performing, by the data container input and analysis module, the additional preliminary analysis.

17. The method of claim 16, wherein the additional preliminary analysis comprises one of:

analyzing the first data container and the first data container management file to determine whether a first predetermined communication path of the first data container management file requires additional throttling analysis of the first data container; or analyzing the first data container management file to determine whether rerouting analysis is required for the first data container.

18. One or more non-transitory computer-readable media storing instructions that, when executed by a computing platform comprising at least one processor, a communication interface, and memory, cause the computing platform to:

receive, by a data container input and analysis module, one or more data container management files, each management file of the one or more data container management files being associated with a different data container;

store, by the data container input and analysis module, the one or more data container management files;

receive, by the data container input and analysis module, a first data container;

retrieve, by the data container input and analysis module, a first data container management file of the one or more data container management files, wherein the first data container management file is associated with the first data container;

perform, by the data container input and analysis module, a first preliminary analysis of the first data container, wherein the first preliminary analysis comprises analyzing the first data container and the first data container management file to determine whether the first data container is complete or incomplete;

in response to determining that the first data container is incomplete, send one or more analysis messages to a data container generation module;

receive, by the data container generation module, the one or more analysis messages;

queue, by the data container generation module, the first data container;

retrieve, by the data container generation module and from the one or more analysis messages, an identification element associated with a missing data set;

send, by the data container generation module and to a source computing device, an amount of time allotted to the source computing device for providing the missing data set;

retrieve, by the data container generation module and from the source computing device, the missing data set; and generate, by the data container generation module, an updated first data container by supplementing the first data container with the missing data set.

* * * * *